United States Patent [19]
Yokoyama et al.

[11] Patent Number: 5,640,636
[45] Date of Patent: Jun. 17, 1997

[54] CAMERA

[75] Inventors: Kunio Yokoyama, Hino; Moriya Katagiri, Tachikawa; Hidenori Sakurai, Hachioji; Yoshiyuki Kitahara, Tokyo; Hiroaki Miyazaki, Kanagawa-ken; Tatsuya Suzuki, Tokyo, all of Japan

[73] Assignee: Olympus Optical Co., Ltd., Tokyo, Japan

[21] Appl. No.: 249,530

[22] Filed: May 26, 1994

[30] Foreign Application Priority Data

| | | | |
|---|---|---|---|
| May 27, 1993 | [JP] | Japan | 5-126053 |
| Jul. 5, 1993 | [JP] | Japan | 5-165467 |
| Jul. 13, 1993 | [JP] | Japan | 5-173461 |
| Jul. 28, 1993 | [JP] | Japan | 5-185875 |

[51] Int. Cl.$^6$ ............................................. G03B 1/00
[52] U.S. Cl. .................... 396/411; 396/418; 396/387
[58] Field of Search ............................ 354/173.1, 173.11, 354/195.1; 384/129, 245; 396/72, 76, 83, 387, 411, 418

[56] References Cited

U.S. PATENT DOCUMENTS 3,994,003  11/1976  Iwashita et al. ................ 354/173
5,365,301  11/1994  Sugita et al. ..................... 354/400

FOREIGN PATENT DOCUMENTS

| | | |
|---|---|---|
| 54-9489 | 4/1979 | Japan. |
| 55-133647 | 10/1980 | Japan. |
| 57-89735 | 6/1982 | Japan. |
| 61-172127 | 1/1985 | Japan. |
| 60-21734 | 2/1985 | Japan. |
| 62-187332 | 8/1987 | Japan. |
| 5-321986 | 12/1993 | Japan. |

*Primary Examiner*—Safet Metjahic
*Assistant Examiner*—Christopher E. Mahoney
*Attorney, Agent, or Firm*—Louis Weinstein

[57] ABSTRACT

A camera having a device for feeding a film, comprises a driving unit for generating driving force, a first unit to be driven for feeding the film in a first direction, a second unit to be driven for feeding the film in a second direction which is different from the first direction, and a portion to be driven always engaged with the driving unit, a shaft unit being angularly moved by the driving unit, a driving portion always engaged with the first unit to be driven for moving the shaft unit while angularly moving the shaft unit in an axial direction of the shaft unit when the shaft unit is angularly moved by the driving unit, and an engagement portion for being engaged with the second unit to be driven.

31 Claims, 27 Drawing Sheets

CAMERA

BACKGROUND OF THE INVENTION

1. Field of the Invention

This invention relates to cameras and, more particularly, to a camera which uses a roll film received within a Patrone (cartridge) and which is provided with a film feeding device for winding and rewinding the film.

2. Related Art And Prior Art Statement

Conventionally, a camera which uses a roll film received within a cartridge is arranged such that the cartridge is loaded into a camera body, idle films of first two or three frames are wound around a winding spool and, thereafter, the film is taken up about the winding spool after each photographing operation, the photographed film is rewound again into the cartridge after photographing, and the cartridge is taken out of the camera body. As a film feeding device which performs film winding operation and film rewinding operation, various kinds of film feeding devices have been considered such as one in which rotational force of a motor or the like is transmitted to a winding spool through a clutch, gears or the like to wind the film, and the clutch is changed over to rotate a rewinding shaft within the cartridge to rewind the film. As the publicly known techniques, there is one disclosed, for example, in Japanese Utility Model Laid-Open No. SHO 60-21734 (21734/1985) or Japanese Patent Laid-Open No. SHO 57-89735 (89735/1982).

A film winding and rewinding mechanism disclosed in Japanese Utility Model Laid-Open No. SHO 60-21734 (21734/1985) is arranged such that resistant force is applied with respect to a rotational direction of a motor which is arranged laterally, and a linear direction of a helical gear is changed over in accordance with the orientation of the relative driving, whereby rotational driving force is transmitted to the winding side and the rewinding side of the film, and the rotational driving force is transmitted to the film winding spool and a film rewinding fork by conversion of a rotational direction due to a bevel gear to wind and rewind the film.

Meanwhile, a film feeding system disclosed in Japanese Patent Laid-Open No. SHO 57-89735 adopts an arrangement in which a driving motor is mounted within a spool chamber, all of the film within the cartridge is previously wound around a spool side before photographing is started, and the film is rewound into the film cartridge through one frame each photographing operation. The winding and rewinding operations are such that the driving force of the motor is directly transmitted to the spool to wind the film, and the driving force of the motor is transmitted to the rewinding fork through the bevel gear via a planetary clutch to rotate the cartridge shaft to rewind the film into the cartridge.

Since, however, the means disclosed in Japanese Utility Model Laid-Open No. SHO 60-21734 uses a helical gear which is used as a clutch, and a bevel gear used for conversion of an angle of the rotary shaft, uses are different from each other, the number of parts increases and, accordingly, a large space is required within the camera body for these components. Thus, efficiency is low. Moreover, since the resistance force is given to the rotational direction of the helical gear in order to produce thrust force in an axial direction, the means has a disadvantage that the efficiency is further low.

Meanwhile, means disclosed in Japanese Patent Laid-Open No. SHO 57-89735 is arranged such that a planetary clutch is used for changing-over of winding and rewinding, and a shaft having bevel gears at both ends is used only for transmission of rewinding power. Accordingly, uses of the respective parts are distinct or separate from each other. Thus, the means has problems that the number of parts increases and the cost increases.

By the way, transmission mechanisms having worm wheels and worm gears have conventionally been proposed variously. For example, a transmission mechanism is used in a motor assembly or the like of a motor driving camera disclosed in Japanese Patent Laid-Open No. SHO 54-41607 (41607/1979). Further, regarding a bearing for a support or pivot shaft for a gear, there is one disclosed in Japanese Patent Publication No. SHO 54-9489 (9489/1979).

Conventionally, as the worm wheel and the worm gear which are used as the transmission mechanism for the power, a worm wheel 31 and a worm gear 33 which are made of metal are used as shown in FIG. 6 of the attached drawings. The metallic worm wheel 31 is formed into configuration great in thickness in radial direction, and a pivot shaft which is small in diameter is fitted in a cylinder in a center of the worm wheel 31.

However, in recent years, the worm wheel 31 is molded in order to reduce the cost. However, the conventional arrangement has the following disadvantages. That is, if the worm wheel 31 is manufactured by molding, gear accuracy and shaft-and-bore accuracy become low because the pivot shaft 32 of the worm wheel 31 is fitted in a cylinder and the worm wheel 31 is great in thickness in a radial direction.

Furthermore, the arrangement has the following disadvantages. That is, consideration is given to the bearing 34 for the worm gear 33. Since the bearing 34 in which the pivot shaft 33a for the worm gear is rotatably fitted and is supported receives a planar forward-end surface of the pivot shaft 33a by a planar surface 36, frictional resistance is large or high so that efficiency is reduced.

Accordingly, in order to remove the disadvantages, an arrangement has been proposed in which, as shown in FIG. 7, a steel ball 35 is arranged within the bearing 34 for the pivot shaft 33a of the worm gear 33, and the forward-end surface of the pivot shaft 33a of the worm gear 33 is received by the steel ball 35. However, this means has a disadvantage that parts increase in number, and assembling is also complicated.

Moreover, conventionally, technical means in which a rotational shaft of a motor is supported by two points and is rotated has been proposed in Japanese Patent Application No. SHO 54-41607 (41607/1979). Furthermore, a mechanism in which a rotational shaft of a sprocket is supported by two points, and is rotated by a gear attached to the sprocket is disclosed in Japanese Patent Laid-Open No. SHO 62-187332 (187332/1987).

However, in a case of the technical means disclosed in Japanese Patent Application No. SHO 54-41607, there is a fear that, when a large or high load is applied to the worm gear, the shaft may bend because of the two-point support. Further, in a case of the technical means disclosed in Japanese Patent Laid-Open No. SHO 62-187332, there is a fear that, when an excessive load is applied in a direction opposite to the rotational direction of the sprocket upon winding, the rotational shaft for the sprocket may bend because the rotational shaft for the sprocket a two-point support.

Meanwhile, various transmission mechanisms for a driving force of the camera which winds and rewinds the film, and a lens frame is moved by means of a single rotational driving source have conventionally been proposed.

As an example of such driving-force transmission mechanism for a camera, an arrangement is disclosed in, for example, Japanese Patent Application No. HEI 4-060548 (060548/1992) in which gears to be driven are selected by rotation of a sun gear in one direction by means of a planetary-gear changing-over mechanism, and are driven by rotation in the other direction.

Moreover, Japanese Patent Laid-Open No. SHO 61-172127 (172127/1986) has disclosed an arrangement in which, In a planetary-gear changing-over mechanism, electromagnetic engaging means is used to be engaged with revolution of a planetary gear, to transmit rotational driving force in opposite directions of a sun gear.

However, since the arrangement disclosed in Japanese Patent Application No. HEI 4-060548 (060548/1994) can transmit only rotation in one direction when the gear to be driven is driven by the sun gear, it is impossible to normally and reversely drive the single gear system. In a case where this is improved so that normal and reverse rotations are transmitted to two locations, four (4) gears in mesh with the planetary gear are required in view of a mechanism. This is a disadvantage in small-sizing or miniaturizing applications.

Furthermore, the arrangement disclosed in Japanese Patent Laid-Open No. SHO 61-172127 (172127/1986) has a problem that electromagnetic engaging means is required in order to cause the sun gear to be engaged so that the cost increases.

OBJECTS AND SUMMARY OF THE INVENTION

A first object of the invention is to provide a space saving efficient camera in which the number of parts is further reduced, and which is provided with a film feeding device for the camera.

A second object of the invention is to provide a camera which is provided with a transmission mechanism which is simple, efficient, and can expect improvement in accuracy.

A third object of the invention is to provide a camera which is provided with a film feeding device which prevents a rotational driving shaft from being curved and bent when an excessive load is applied to the rotational driving shaft of a gear.

A fourth object of the invention is to provide a camera which is provided with a driving-force transmission mechanism which is low in price or cost and is small-sized, and can drive a lens frame and a film by the use of a single rotational driving source.

Briefly, according to the invention, there is provided a camera having a device for feeding a film, comprising:

driving means for generating a driving force;

first means to be driven for feeding the film in a first direction;

second means to be driven for feeding the film in a second direction which is different from the first direction; and a portion to be driven always engaged with the driving means, shaft means being angularly moved by the driving means, a driving portion always engaged with the first means to be driven for moving the shaft means while angularly moving the shaft means in an axial direction of the shaft means when the shaft means is angularly moved by the driving means, and an engagement portion engaged with the second means to be driven.

These objects and advantages of the present invention will become further apparent from the following detailed explanation.

BRIEF DESCRIPTION OF THE DRAWINGS

FIG. 36B is a cross-sectional view showing a condition under which the movable element of the switch in the embodiment is engaged with an outer periphery of the rotary tube to be in contact with a fixed element so as to be turned ON;

DETAILED DESCRIPTION OF THE PREFERRED EMBODIMENTS

Various embodiments of the invention will hereunder be described with reference to the accompanying drawings.

Figure 1:
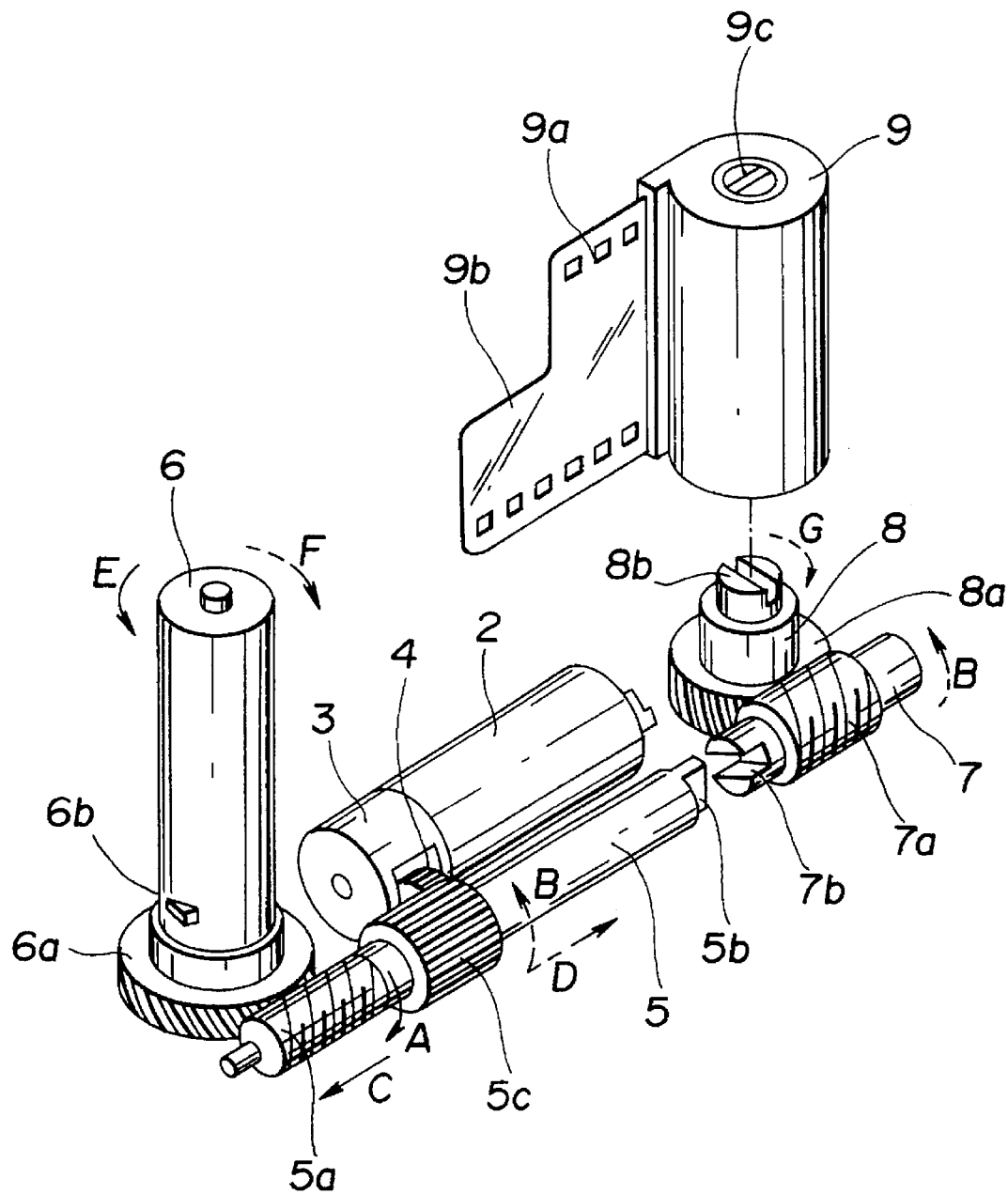
FIG. 1 is a perspective view of a principal portion, showing a film feeding device in a first embodiment of the invention.

FIG. 1 is a perspective view of a principal portion, showing a film feeding device in a first embodiment of the invention. As shown in FIG. 1, a driving motor 2 capable of being normally rotated and reversely rotated is fixedly arranged laterally at a lower center of a camera body (not shown). A film winding spool 6 is arranged on one end of the motor 2, that is, on the left in FIG. 1, and a film rewinding fork (hereinafter referred to as "an R-fork") 8 is arranged on the other side, that is on the right in FIG. 1. A driving shaft 5 forming second shaft means to be described subsequently is laterally mounted rotatably in front of the motor 2, and a film rewinding shaft (hereinafter referred to as "an R-shaft") for forming first shaft means 7 to be described subsequently is laterally mounted rotatably on an extension of a control axis of the driving shaft 5 in front of the R-fork 8. The motor 2 has an output shaft thereof which projects toward the winding spool. The output shaft is decelerated in rotational driving force by a speed-reduction gear train due to a planetary gear mechanism, and transmits speed-reduced rotational force to a gear 5c that is input gear means, through a spur gear 4. In this connection, the speed-reduction gear train is covered by a gear box 3.

The driving shaft 5 that is the second shaft means is supported on the camera body so as to be rotatable normally and reversely, that is, rotatable in directions indicated by A and B in FIG. 1, and so as to be movable in an axial direction, that is, in directions indicated by arrows C and D. The gear 5c which is provided intermediate the driving shaft 5 and which is in mesh with the spur gear 4, a helical gear 5a which is formed on one side end projecting forwardly at a lower portion of the spool 6 and which has torsion or twist in a left-hand screw direction, and a projection 5b which is formed on the center of an end surface of the other side end, which transmits and outputs rotational force from the driving motor 2 and which is a rotational output portion are integrally provided on the driving shaft 5.

The film winding spool 6 stands up in an orientation perpendicular to the driving shaft 5, and is supported or pivoted on the camera body for angular movement. The film winding spool 6 is integrally formed with a helical gear 6a that is a winding gear means which is in mesh with the helical gear 5a of the driving shaft 5, at a lower end of the film winding spool 6, and an engaging pawl 6b engaged with perforations 9b in a film 9a to wind the film 9a, at a lower portion of a peripheral surface of the spool 6. Further, guide means (not shown) for guiding the film 9a is urged against the film winding spool 6. Accordingly, resistant force in a rotational direction is applied to the film winding spool 6.

Meanwhile, the R-shaft 7 that is the first shaft means is located coaxially with the driving shaft 5, and is pivoted on the camera body for angular movement. The R-shaft 7 is integrally formed with a slot 7b which is formed on an inner end of the R-shaft and which is a rotational inputting portion with which the projection 5b on the driving shaft 5 that is the second shaft means is engaged to input rotational force, and a helical gear 7a which is provided intermediately and which is transmitting-gear means having a twist in a left-hand screw direction.

Meanwhile, the R-fork 8 that is a means to be transmitted is pivoted on the camera body for angular movement. A helical gear 8a that is rewinding gear means which is in mesh with the helical gear 7a that is transmitting gear means of the R-shaft 7 is integrally provided on a lower end of the R-fork 8, and a fork pawl 8b is integrally provided on an upper end of the R-folk 8. A film cartridge 9 is mounted on an upper surface of the R-folk 8. The fork pawl 8b is engaged with a lower end of a film winding shaft 9c to which an end of the film is fixedly mounted within the cartridge 9 and around a peripheral surface of which the film 9a is wound, and serves to transmit rotational force to the shaft 9c.

Subsequently, operation of the film feeding device of the present embodiment arranged as described above will be described.

First, film winding operation of the film feeding device will be described. When the film cartridge 9 is loaded on the R-fork 8, well-known detecting means (not shown) detects that the film is loaded on the camera body, and the motor 2 is driven by control means such as CPU or the like. Rotational driving force of the motor 2 is decelerated by a speed-deceleration gear train within the gear box 3, and is transmitted to the driving shaft 5 through the spur gear 4. Whereupon, the driving shaft 5 is rotated in the direction indicated by the arrow A.

At the beginning of rotation of the driving shaft 5, the film winding spool 6 is not rotated because guide means for guiding the film (not shown) serves as resistant force. Since the helical gear 5a of the driving shaft 5 is in mesh with the helical gear 6a of the film winding spool 6, the helical gear 5a receives thrust force. The driving shaft 5 is moved in a direction indicated by the arrow C until the driving shaft 5 is abutted against a stopper (not shown). When the driving shaft 5 is abutted against the stopper, the driving shaft 5 cannot be moved axially more than that. Accordingly, the film winding spool 6 begins rotation in a direction E.

For this reason, the engaging pawl 6b which is provided on a lower portion of a peripheral surface of the film winding spool 6 is engaged with the perforations 9a in the film to wind the film 9b around a peripheral surface of the film winding spool 6. Automatic loading of the film is completed at the end of preliminary winding, and photographing starts. The quantity of film feeding is detected by well-known film-feeding-quantity detecting means (not shown), during photographing. Rotation of the motor 2 is controlled by control means to operate winding through one frame, to thereby perform desired photographing.

Subsequently, a film rewinding operation will be described. First, the control means rotates the motor 2 in a direction opposite to that upon the winding operation, by an input from the well-known rewinding operation means, or the like. Whereupon, the driving shaft 5 is rotated in a direction indicated by the arrow B. However, in the initial stage of the rotation, thrust force acts on the helical gear 5a with respect to the helical gear 6a. The driving shaft 5 starts to move in a direction indicated by the arrow D. When the projection 5b of the driving shaft 5 is fitted in the slot 7b in the R-shaft 7, the projection 5b is abutted against a stopper (not shown) at the position or on the spot so that movement of the driving shaft 5 in the direction D stops. Accordingly, the rotational driving force in the direction indicated by the arrow B is transmitted to the R-shaft 7 from the driving shaft 5.

By the rotation of the R-shaft 7, the R-fork 8 starts to be rotated in the direction indicated by the arrow G. The fork pawl 8b which is formed integrally together with the R-fork 8 is simultaneously rotated to transmit rotational driving force to a winding shaft 9c of the film cartridge 9 which is engaged with the fork pawl 8b. Accordingly, the film 9a which is wound around the spool 6 is rewound into the cartridge 9.

At this moment, a gear ratio or the like between the helical gears 6a and 8a is set such that speed rotating the film winding spool 6 in a direction F in parallel with the rewinding operation by the driving force from the motor 2 is faster than the speed rotating the film winding spool 6 in the direction indicated by the arrow F through the film 9a which is rewound by the R-fork 8. Accordingly, the film 9a which is wound around the film winding spool 6 is loosened in winding. Thus, the film 9a is taken up into the film cartridge 9 without being abnormally tensioned or strained, and the film is smoothly rewound and fed. When completion or end of the rewinding of the film 9a into the film cartridge 9 is detected by the well-known film-feeding-quantity detecting means (not shown), the motor 2 stops. The film rewinding operation thus ends.

In this manner, the helical gears 5a, 6a, 7a and 8a in the present embodiment are used both as changing-over means of film winding and rewinding and direction conversion means of the rotational driving shaft to the shaft to be driven. Accordingly, a transmitting-force changing-over element such as a clutch or the like, direction conversion means such as a bevel gear or the like are dispensed with. Thus, a lesser number of parts is sufficient, and efficiency is considerably superior in terms of saving of space.

In connection with the above, the present embodiment uses a helical gear. However, a film feeding device similar to the arrangement indicated in the above-described embodiment can easily be arranged if a screw gear, a worm gear and a worm wheel, or a helical gear and a helical crown gear are used. It is thus possible to produce similar advantages.

As described above, the embodiment forms a mechanism which skillfully utilizes the thrust force which is generated on one gear at the time when the other gear having tilting teeth provisionally stops to both use changing-over of the driving-force transmission of the winding and rewinding of the film and conversion of the transmitting direction. Accordingly, a lesser number of parts is sufficient, and it is possible to save space. Thus, it is possible to provide a film feeding device for a camera, which is small in size, low in cost, superior in efficiency, and which dissolves conventional or prior-art problems.

An embodiment of a transmission mechanism comprising a worm wheel and a worm gear will next be described. In this connection, the embodiment is a transmission mechanism which is applied to the above-described film feeding device for a camera.

Figure 2:
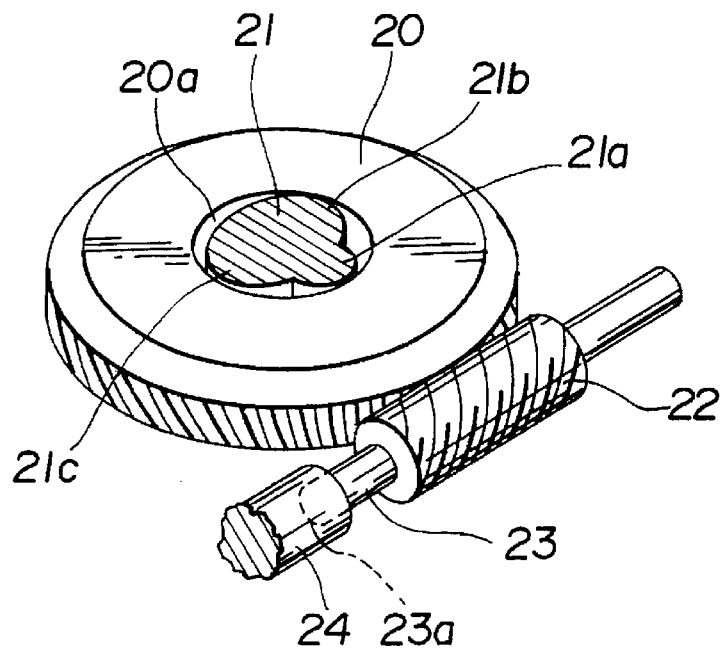
FIG. 2 is a perspective view showing an embodiment of a transmission mechanism in the invention.
Figure 3:
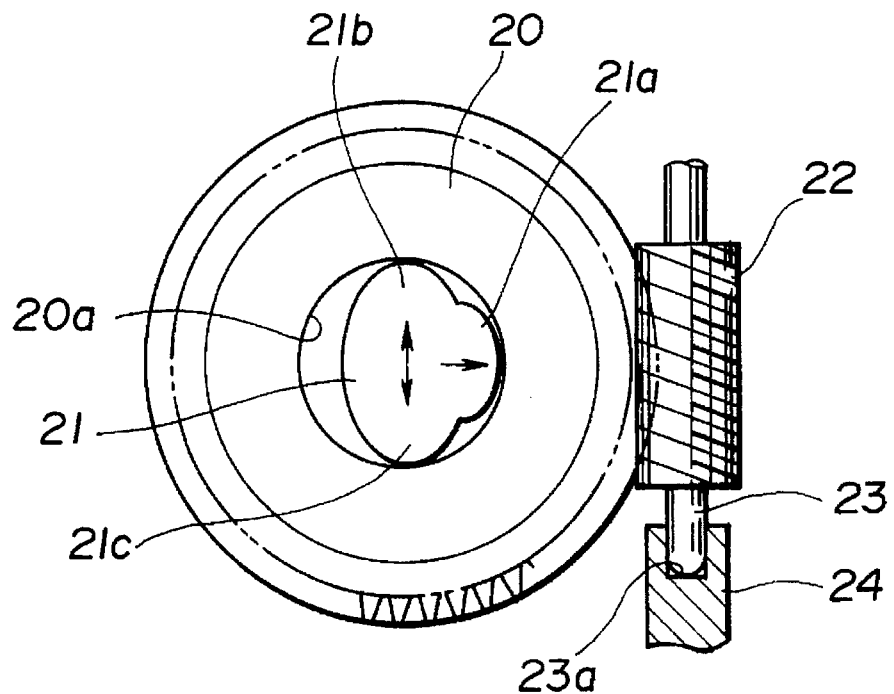
FIG. 3 is a top plan view of the transmission mechanism in FIG. 2.

As shown in FIGS. 2 and 3, the transmission mechanism comprises a worm gear 22, and a worm wheel 20 which is in mesh with the worm gear 22 and which is manufactured by molding.

The worm gear 22 is pivoted on a pivot 23, and an end 23a of the pivot 23 is formed into semi-spherical configuration. Accordingly, contact of the end 23a of the pivot 23 with respect to a bearing 24 forms substantially point contact. Thus, loss due to friction is minimized.

Meanwhile, the worm wheel 20 which is in mesh with the worm gear 22 is a thin wall configuration which is uniform in a radial direction. Thus, an attempt is made to improve accuracy. The worm wheel 20 is rotatably supported by the pivot 21 which is fitted into a central through-bore 20a in the worm wheel 20. Pivot 21 has a peripheral surface thereof which is formed by at least three cylindrical surfaces, that is, a first projection 21a, a second projection 21b and a third projection 21c.

These projections 21a–21c are formed as follows for the following object. That is, the first projection 21a is formed so as to project in an orientation perpendicular to the pivot 23 of the worm gear 22 in order to accurately keep a distance between an axis of the worm gear 22 and an axis of the worm wheel 20. The first projection 21a is abutted against an inner peripheral surface of the central through-bore 20a in the worm wheel 20.

The second projection 21b and the third projection 21c project respectively in directions perpendicular to a direction between the axes of the worm gear 22 and the worm wheel 20 and in directions opposite to each other, and serve to take rattling between the pivot 21 and the worm wheel 20.

If the pivot 21 is formed into a normal columnar shape or configuration, efficiency drops because frictional resistance increases. However, according to the embodiment, since the pivot 21 is received by three points of the necessary minimum, resistant force upon rotation is reduced to prevent the efficiency from dropping.

In this manner, according to the present embodiment, by the fact that the end 23a of the pivot 23 is brought to the semi-spherical configuration, the contact of the end 23a with respect to the bearing 24 becomes substantially a point contact so that the loss due to the friction is minimized. Further, by the fact that the peripheral surface of the pivot 21 of the worm wheel 20 is formed by a spherical surface, that is, by the first projection 21a, the second projection 21b and the third projection 21c, the peripheral surface of the pivot 21 can be made thin in wall thickness upon molding so that the accuracy is improved. Moreover, the resistant force upon rotation is reduced to prevent the efficiency from falling or dropping.

Figure 4:
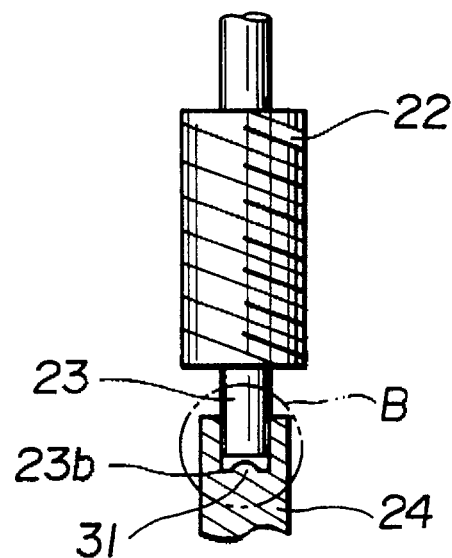
FIG. 4 is a cross-sectional view of a principal portion of another embodiment of the transmission mechanism in the invention.
Figure 5:
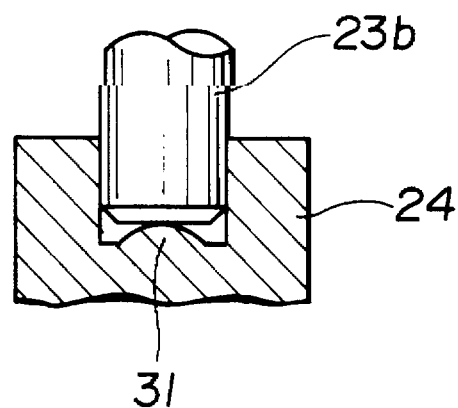
FIG. 5 is a fragmentary enlarged cross-sectional view of a portion of a sign or code B in FIG. 4.
Figure 6:
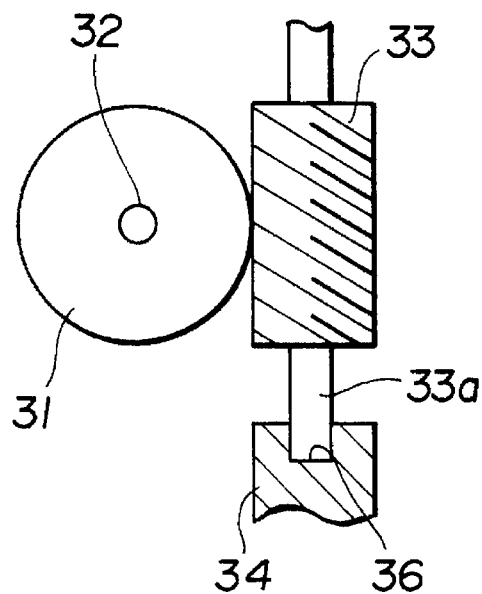
FIG. 6 is a top plan view showing an example of a conventional transmission mechanism.
Figure 7:
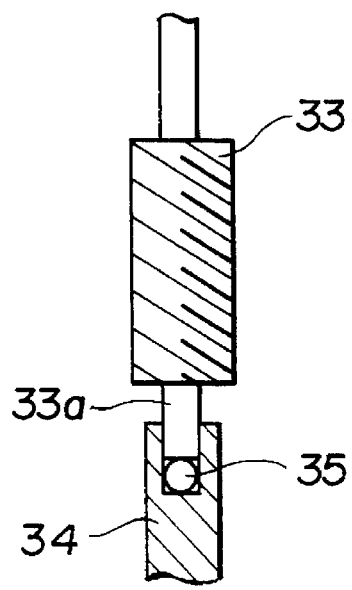
FIG. 7 is a cross-sectional view of a principal portion, showing an example of a bearing for the conventional transmission mechanism of FIG. 6.

FIGS. 4 and 5 are views showing another embodiment of the transmission mechanism. In this connection, the same reference numerals are applied to elements common to the aforesaid embodiment, and duplicate description will be omitted.

A portion in which the other embodiment is different from the aforementioned embodiment is that the end 23b at a forward end surface of the pivot 23 is not formed into the semi-spherical shape, but a bearing bottom surface 31 adjacent to the bearing 24 is formed into a semi-spherical shape or contour. If the other embodiment is arranged in this manner, it is possible to produce function and advantages similar to those of the aforementioned embodiment.

As described above, according to the transmission mechanism, it is possible to minimize the loss due to the friction of the portion of the thrust bearing. Since steel balls or the like are not used, complicated or troublesome time is not consumed for assembly. Furthermore, the wall can be reduced when the worm wheel is molded so that the accuracy can be improved. Since the pivot for the worm wheel receives the worm wheel at the points of the necessary minimum, the resistant force upon rotation can be reduced so that it is possible to prevent the efficiency from dropping.

A film feeding device according to a second embodiment of the invention will next be described.

Figure 8:
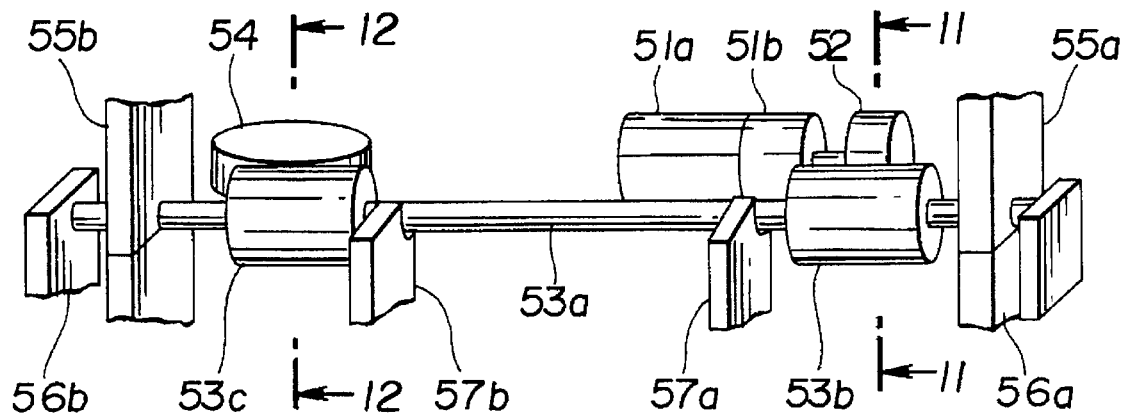
FIG. 8 is a perspective view showing a film feeding device of a second embodiment of the invention.

FIG. 8 is a perspective view showing the film feeding device that is the second embodiment of the invention.

As shown in FIG. 8, a motor 51a is fixedly mounted on a camera body (not shown), and is a motor capable of being rotated in both normal and reverse directions. A pinion gear (not shown) is integrally mounted on a forward end of a rotary shaft of the motor. Further, a well-known planetary gear mechanism 51b which has the rotary shaft thereof on an axis coaxial with a rotary axis of the motor 51a and which is in mesh with the pinion gear is arranged at the forward end of the motor 51a. Moreover, an output gear 52 is integrally provided on an output shaft of the planetary gear mechanism 51b.

Meanwhile, a taking-up spool (not shown) for winding the film is arranged for angular movement within a spool chamber which is formed on one side of the camera body. A spool gear 54 which is moved angularly in an integral manner to the taking-up spool is arranged on one end of the taking-up spool.

A rotary driving shaft 53a is arranged substantially in parallel with a central axis of the motor 51a. An input gear 53b which is capable of being in mesh with the output gear 52 is arranged at a position which is opposed against the output gear 52 in the rotary driving shaft 53a so as to be moved angularly integrally with the rotary driving shaft 53a, while an SP worm gear 53c is arranged at a position which is opposed against the spool gear 54 so as to be moved angularly in an integral manner to the rotary driving shaft 53a. In this connection, if the input gear 53b and the SP worm gear 53c transmit the rotary driving force to the rotary driving shaft 53a, or are arranged such that the rotary driving force is transmitted to the rotary driving shaft 53a, the input gear 53b and the SP worm gear 53c are provided separately from the rotary driving shaft 53a, and need not be arranged integrally with the rotary driving shaft 53a.

Further, one end of the rotary driving shaft 53a, that is, a further forward end of the input gear 53b is pivoted, for angular movement, on a bearing which is formed by a shaft support element 55a fixed to the camera body (not shown) and a shaft support element 56a which is engaged with one end of the shaft support element 55a.

Figure 9:
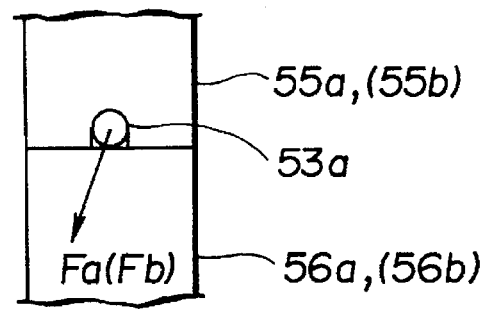
FIG. 9 is a side elevational view of a principal portion, showing a condition under which a rotational driving shaft is inserted into a bearing for a shaft support or pivot element, in the second embodiment.

FIG. 9 is a side elevational view of a principal portion, showing a condition under which the rotary driving shaft 53a is inserted into the bearing which is formed by the shaft support element 55a and the shaft support element 56a.

As shown in FIG. 9, a U-shaped groove is formed in an engagement with the shaft support element 56a in one end of the shaft support element 55a. The U-shaped groove and the engaging surface of the shaft support element 56a cooperate with each other to form the bearing.

Moreover, the shaft support element 55a, a shaft support element 55b which presents a contour similar to that of the shaft support element 56a, and a shaft support element 56b are fixedly mounted on the camera body in a direction of the other end of the rotary driving shaft 53a, that is, in a direction of a further forward end of the SP worm gear 53c. Similarly to the above, the other end of the rotary driving shaft 53a is pivoted for angular movement by a bearing which is formed by the U-shaped groove in the shaft support element 55b and the shaft support element 56b.

Bending prevention elements 57a and 57b for the rotary driving shaft 53a are arranged between the input gear 53b and the SP worm gear 53c and adjacent to the input gear 53b and the SP worm gear 53c.

Figure 10:
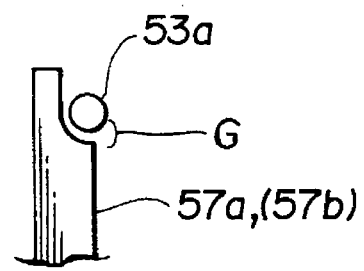
FIG. 10 is a side elevational view of a principal portion, showing a positional relationship between a bending prevention element and a rotational driving shaft in the second embodiment.

FIG. 10 is a side elevational view of a principal portion, showing the positional relationship between the bending prevention elements 57a and 57b and the rotary driving shaft 53a.

Portions of the bending prevention elements 57a and 57b adjacent to proximal ends thereof are fixedly mounted on the camera body, while cut-outs are formed in portions of the forward ends of the bending prevention elements 57a and 57b, which are opposed against the rotary driving shaft 53a. A space having a minute gap G is formed in a direction radial to the rotary driving shaft 53a.

In a case of the film feeding device according to the second embodiment, which has such arrangement, the rotary driving force of the motor 51a is transmitted to the input gear 53b through the well-known planetary gear mechanism 51b and the output gear 52. Furthermore, the rotary driving force of the motor 51a is transmitted to the spool gear 54 through the rotary driving shaft 53a and the SP worm gear 53c.

Figure 11:
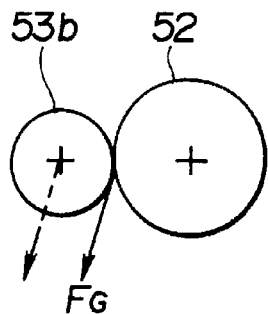
FIG. 11 is a cross-sectional view of a principal portion, showing a cross-section taken along a line 11—11 in FIG. 8.

FIG. 11 is a cross-sectional view of a principal portion, showing an a cross-section 11—11 in FIG. 8.

As shown in FIG. 11, the input gear 53b receives force FG from the output gear 52 by driving force from the motor 51a, whereby force Fa is applied to the shaft support elements 56a and 56a from the rotary driving shaft 53a (refer to FIG. 9). The arrangement is such that, in a case where the force Fa is a force worthy of bending the rotary driving shaft 53a, when the rotary driving shaft 53a is bent, the rotary driving shaft 53a is received by the bending prevention element 57a, and force applied to the input gear 53b is rotatably received by two points including the shaft support elements 56a and 56a and the bending prevention element 57a.

Figure 13:
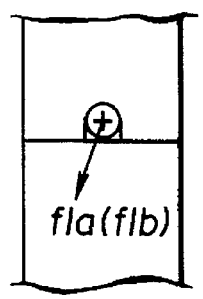
FIG. 13 is a side elevational view of a principal portion, showing a condition under which a rotational driving shaft is inserted into a bearing for a shaft support element at the time when bending drive force is applied to the rotational driving shaft, in the second embodiment.
Figure 14:
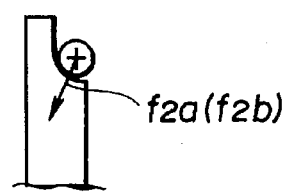
FIG. 14 is a side elevational view of a principal portion, showing a positional relationship between a bending prevention element and a rotational driving shaft at the time when bending drive force is applied to the rotational driving shaft, in the second embodiment.

FIG. 13 is a side elevational view of a principal portion, showing a condition under which the rotary driving shaft 53a is inserted into the bearing which is formed by the shaft support element 55a and the shaft support element 56a at the time when bending drive force is applied to the rotary driving shaft, in the second embodiment. Moreover, FIG. 14 is a side elevational view of a principal portion, showing a positional relationship between the bending prevention elements 57a and 57b and the rotary driving shaft 53a, at the time when the bending drive force is applied to the rotary driving shaft.

Figure 12:
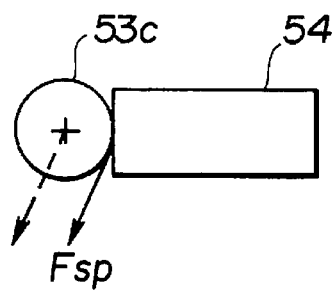
FIG. 12 is a cross-sectional view of a principal portion, showing a cross-section taken along a line 12—12 in FIG. 8.

FIG. 12 is a cross-sectional view of a principal portion, showing a cross-section taken along a line 12—12 in FIG. 8.

The SP worm gear 53c also receives force Fsp from the spool gear 54 by driving force from the motor 51a, as shown in FIG. 12, similar to the input gear 53b, whereby force Fb is applied to the shaft support elements 55b and 56b from the rotary driving shaft 53a (refer to FIG. 9). The arrangement is such that, in a case where the force Fb is force which is worthy of bending the rotary driving shaft 53a, the rotary driving shaft 53a is received by the bending prevention element 57b when the rotary driving shaft 53a is bent, and force applied to the SP worm gear 53c is rotatably received by two points including the shaft support elements 55b and 56b and the bending prevention element 57b (refer to FIGS. 13 and 14).

According to the film feeding device of the second embodiment, an excessive load of the order of being the rotary driving shaft 53a is applied to the input gear 53 and the SP worm gear 53c. Thus, even if the rotary driving shaft 53a is bent, the excessive load is abutted against the forward ends of the bending prevention elements 57a and 57b, whereby force which is applied by the rotary driving shaft 53a to the shaft support elements 55a, 55b, 56a and 56b is received by the shaft support elements 55a, 55b, 56a and 56b and the bending prevention elements 57a and 57b, whereby force applied to the shaft support elements 55a, 55b, 56a and 56b can be dispersed, making it possible to prevent the rotary driving shaft 53a from being further bent. Accordingly, it is possible to prevent the rotary shaft of the gear means from being bent.

Figure 15:
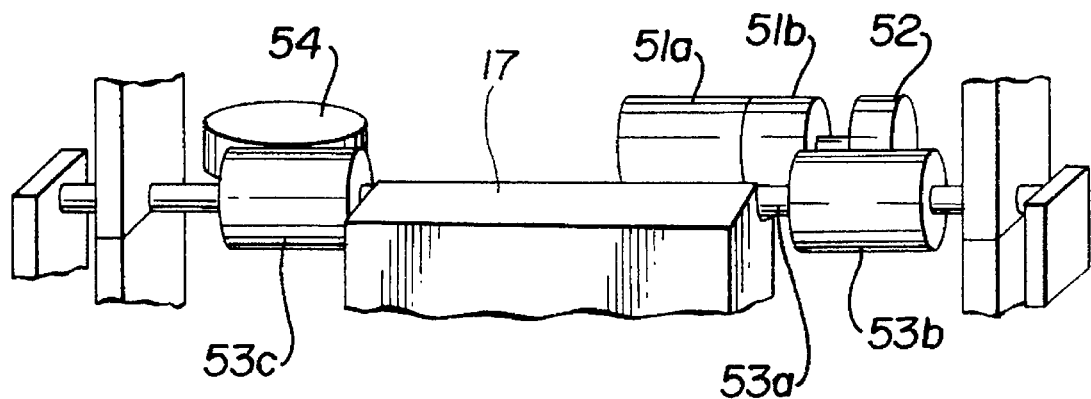
FIG. 15 is a perspective view showing a film feeding device in a third embodiment of the invention.

FIG. 15 is a perspective view showing a film feeding device according to a third embodiment of the invention.

The third embodiment is arranged similarly to the second embodiment except that a contour and an arranged location of a bending prevention element is different from that of the second embodiment.

Figure 16:
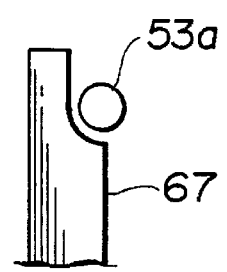
FIG. 16 is a side elevational view of a principal portion, showing a positional relationship between a bending prevention element and a rotational driving shaft in the third embodiment.

Furthermore, FIG. 16 is a side elevational view of a principal portion, showing a positional relationship between a bending prevention element 67 and a rotary driving shaft 53a in a third embodiment.

As shown in FIG. 16, a minute space similar to that in the second embodiment is defined between a forward end of the bending prevention element 67 and the rotary driving shaft 53a. Thus, the third embodiment can produce similar advantages.

Figure 17:
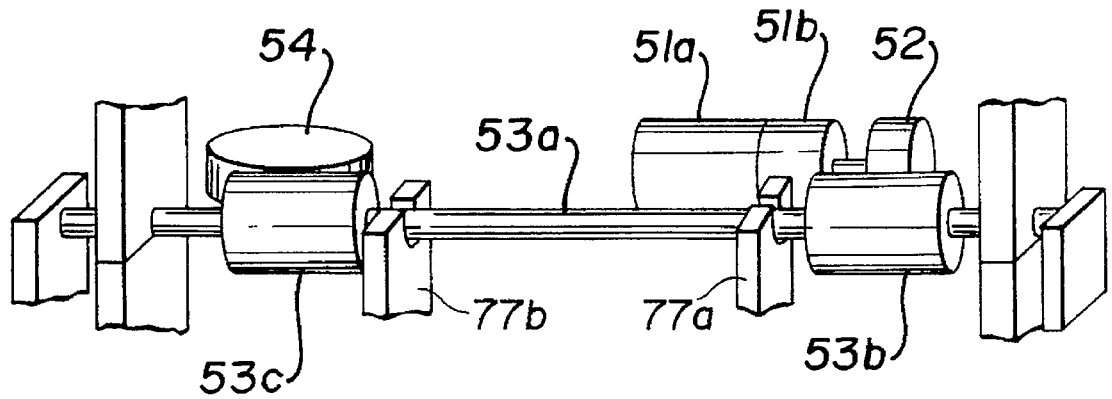
FIG. 17 is a perspective view showing a film feeding device in a fourth embodiment of the invention.

FIG. 17 is a perspective view showing a film feeding device according to a fourth embodiment of the invention.

The fourth embodiment is similar in arrangement to the second embodiment except that a contour of a bending prevention element is different from that in the second embodiment.

Figure 18:
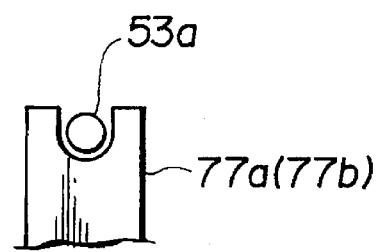
FIG. 18 is a side elevational view of a principal portion, showing a positional relationship between a bending prevention element and a rotational driving shaft in the fourth embodiment.

Further, FIG. 18 is a side elevational view of a principal portion, showing a positional relationship between bending prevention elements 77a and 77b and a rotary driving shaft 53a in the fourth embodiment.

As shown in FIG. 18, a U-shaped groove is defined in forward ends of the bending prevention elements 77a and 77b so as to receive the rotary driving shaft 53a. Similar to the second embodiment, a minute gap is defined between the U-shaped groove and the rotary driving shaft 53a. Thus, the third embodiment can produce similar advantages.

Figure 19:
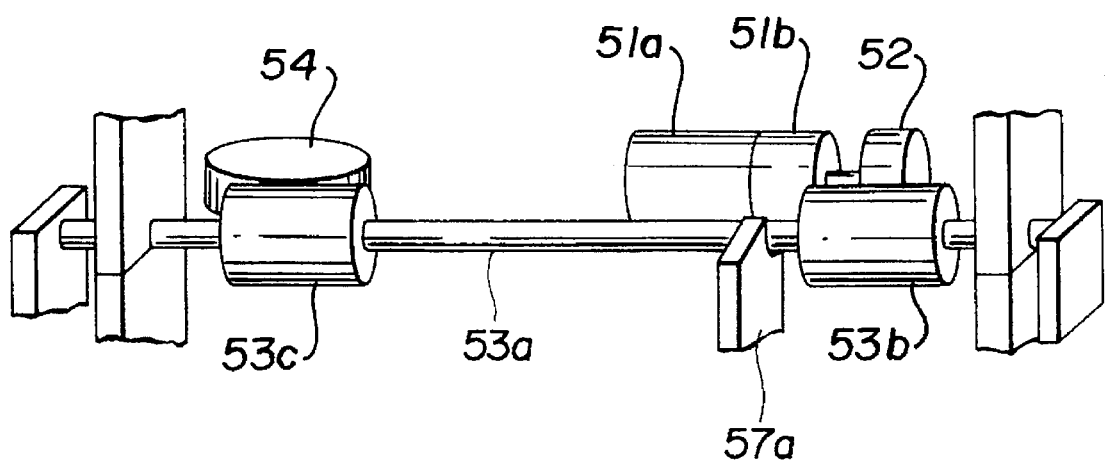
FIG. 19 is a perspective view showing a film feeding device in a fifth embodiment of the invention.

FIG. 19 is a perspective view showing a film feeding device according to a fifth embodiment of the invention.

In the second embodiment, the two (2) bending prevention elements have been arranged. In the fifth embodiment, however, a single bending prevention element is arranged adjacent to the input gear 53b. The other arrangement is similar to that of the second embodiment.

The fifth embodiment is so arranged as to produce advantages similar to those of the second embodiment with fewer elements.

As described above, according the film feeding device according to each of the second-fifth embodiments, it is possible to provide a film feeding device which prevents the rotary driving shaft from being bent when excessive load is applied to the rotary driving shaft of the gear.

A driving-force transmission mechanism for the camera which is applied to the film feeding device according to each of the first-fifth embodiments will next be described. The transmission mechanism relates to a driving-force transmission mechanism for a camera which winds and rewinds a film and which moves a lens frame by a single rotation driving source.

An embodiment of the driving-force transmission mechanism will be described hereunder with reference to the drawings.

FIGS. 20 to 41 show an embodiment of the driving-force transmission mechanism for the camera.

Figure 20:
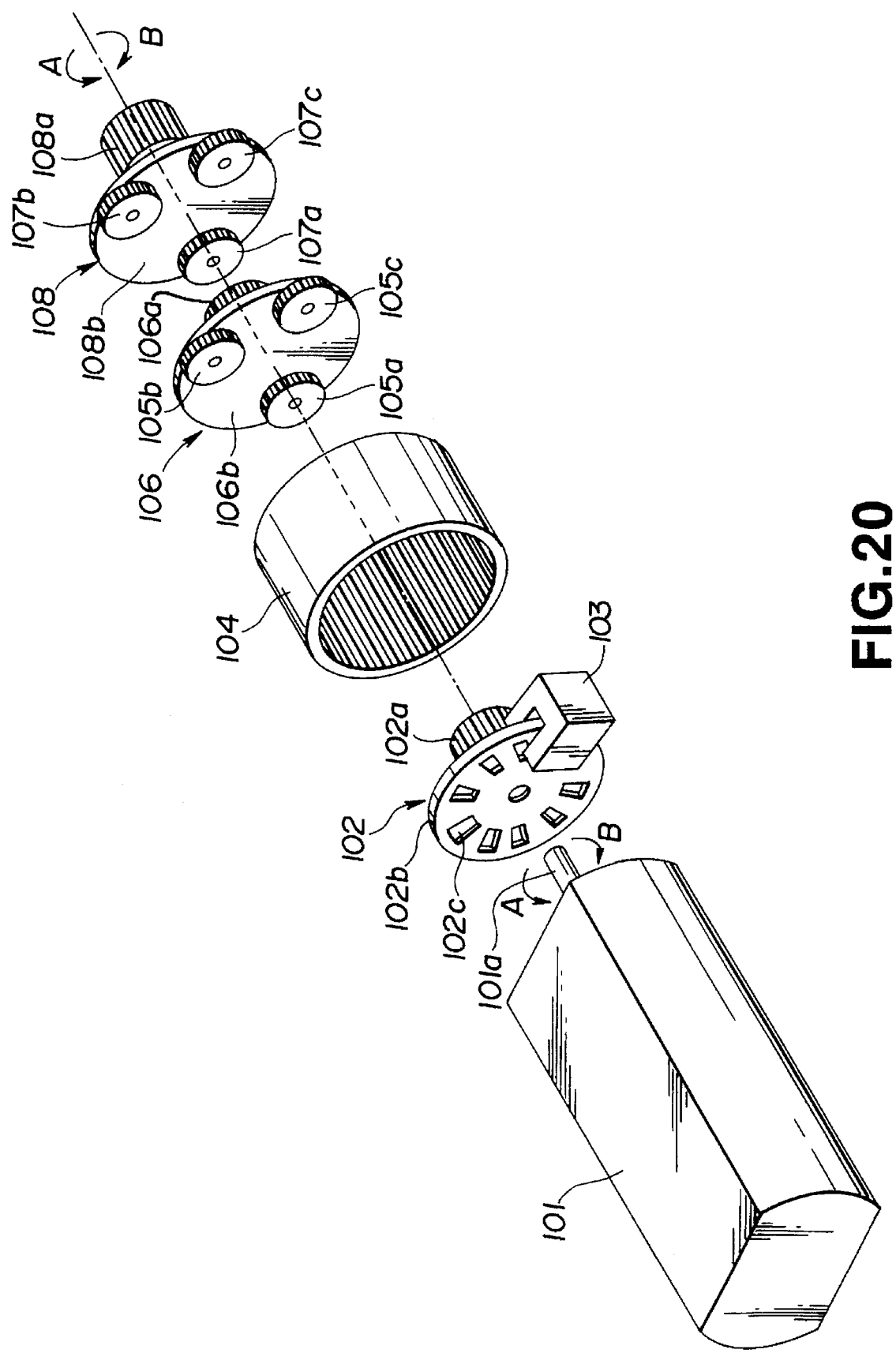
FIG. 20 is a perspective view showing a planetary gear mechanism in an embodiment of a driving-force transmission mechanism in the invention, in disassembly or decomposition along a direction of an output shaft.

FIG. 20 is a perspective view showing, in an exploded fashion along a direction of an output shaft, a planetary-gear mechanism in the camera according to the present embodiment.

A motor 101 that is a rotary driving source is capable of being driven normally and reversely. The motor 101 has a motor shaft 101a to which a sun gear 102 is fixedly mounted for angular movement together therewith.

The sun gear 102 is arranged such that a gear portion 102a which is small in diameter and which is thick in wall thickness is provided in coaxial relation with a disk portion 102b which is large in diameter and which is thin in wall thickness. A plurality of bores 102c which are slightly elongated in a radial direction for counting pulses are provided in the disk portion 102b at equal pitches along a peripheral direction. A photo-interrupter 103 in the form of a reverse C-shape is so provided as to put the bore 102c in the disk portion 102b from both sides.

Three (3) planetary gears 105a, 105b and 105c are in mesh with three (3) equally divided locations of a periphery of the gear portion 102a of the sun gear 102. Moreover, these planetary gears 105a, 105b and 105c are in mesh with a cylindrical internal gear 104 which is fixedly mounted on a camera body (not shown).

The planetary gears 105a, 105b and 105c are rotatably mounted to three equally divided positions in a peripheral direction of the disk portion 106b of the intermediate gear 106. The intermediate gear 106 has a gear portion 106a which is small in diameter and which is slightly thick in wall thickness, and a disk portion 106b which is large in diameter and which is thin in wall thickness, in coaxial relation to each other.

Three (3) planetary gears 107a, 107b and 107c are in mesh with three (3) equally divided positions in a peripheral direction, on a periphery of the gear portion 106a of the intermediate gear 106. These planetary gears 107a, 107b and 107c are further in mesh with the internal gear 104.

The planetary gears 107a, 107b and 107c are rotatably mounted on an output gear 108 at three (3) equally divided positions in a peripheral direction. The output gear 108 has a gear portion 108a which is small in diameter, and which is provided in projection from a disk portion 108b which is large in diameter and which is thin in wall thickness, through a spacer 108c (refer to FIG. 21) in coaxial relation thereto.

Figure 21:
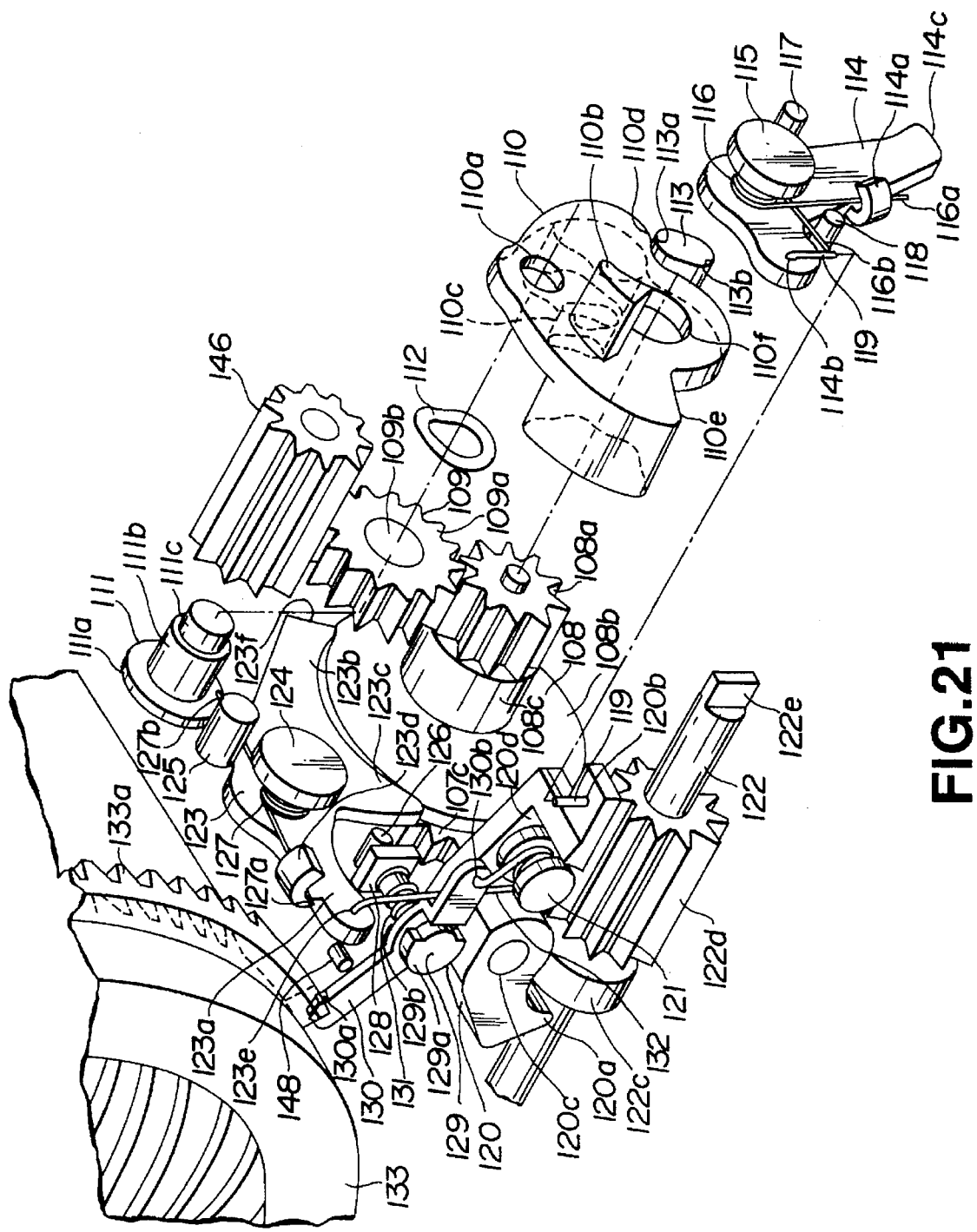
FIG. 21 is a perspective view showing a planetary-gear changing-over mechanism in the embodiment in partial decomposition.

Next, FIG. 21 is a perspective view showing, in partial exploded manner, a planetary-gear changing-over mechanism.

A planetary gear 109 is in mesh with the gear portion 108a of the output gear 108. The planetary gear 109 is arranged such that a shaft bore 109b is provided by boring at a center of a gear portion 109a, and a support shaft 111 has a shank 111b which is inserted into the shaft bore 109b for angular movement. A friction washer 112 is further inserted over the shank 111b of the support shaft 111 with the planetary gear 109 put therebetween. A projection 111c which further projects from the shank 111b of the support shaft 111 is fixedly mounted in a bore 110a in a gear arm 110 which is supported for rotation in coaxial relation to the rotary shaft of the output gear 108.

The friction washer 112 is a spring washer, and is formed slightly in curvature. Thus, the planetary gear 109 is urged by a small force from the side of the gear arm 110 toward a flange 111a of the support shaft 111.

The gear arm 110 is supported for angular movement on a shaft which is provided in projection from the gear portion 108a of the output gear 108 with a center of the shaft bore 110f serving as a rotary shaft, and an angularly movable range or scope thereof is from a position where an engaging portion 110d of the gear arm 110 is abutted against an abutment 113a of a gear arm stopper 113 which is integrally provided on the camera body (not shown), to a position where the other engaging portion 110e of the gear arm 110 is abutted against the other abutment 113b of the gear arm stopper 113.

The gear arm 110 is provided in projection with a rewinding engagement 110b in a direction of a rotary shaft from a location adjacent to the shaft bore 110f. On the side of the rewinding engagement 110b, a rewinding engagement lever 114 that a generally L-shaped second disengagement means is rotatably supported by a rewinding engagement shaft 115 which is fixedly mounted on the camera body (not shown). Further, the gear arm 110 is provided in projection with a feeding engagement 110c in the direction of the rotary shaft from a side opposite to the rewinding engagement 110b in the vicinity of the shaft bore 110f.

A rewinding release spring 116 made of, for example, a toggle spring is mounted on the rewinding engagement shaft 115. The rewinding release spring 116 has one end 116a thereof which is latched to a spring latch 114a of the rewinding engagement lever 114, and the other end 116b which is latched to a boss 118 which is fixedly mounted on the camera body (not shown). Thus, the rewinding engagement lever 114 is biased in a CW direction in the figure. In this connection, an end 114c of the rewinding engagement lever 114 is adapted to be engaged with the rewinding engagement 110b of the gear arm 110.

Moreover, the rewinding engagement lever 114 is restricted in range or scope of angular movement thereof by a pair of bosses 117 and 118 which are fixedly mounted on the camera body (not shown).

A film-end detecting lever 120 is mounted on the camera body by an attaching bore 120c for angular movement. The film-end detecting lever 120 has a forward end 120a thereof which is abutted against film-end cams 122b and 122c (refer to FIG. 29) of a driving shaft 122 to be described subsequently. Furthermore, the other end 120d of the film-end detecting lever 120 avoids a string guide shaft 121 and is bent into a reverse C-shaped contour and, subsequently, forms a termination. The termination is provided with a bore 120b, and one end of a string-like element 119 is fixedly mounted therein. The other end of the string-like element 119 enters a bore 114b in the rewinding engagement lever 114 and is fixedly mounted thereto.

A feeding engagement lever 123 that is a first disengagement means is supported by a feeding engagement shaft 124 for angular movement, which is fixedly mounted on the camera body (not shown), on the side of the feeding engagement 110c of the gear arm 110. The feeding engagement lever 123 has three (3) arms 123a, 123b and 123c. The arm 123a is provided, at another side end thereof, a spring latch 123d, and is provided in opening, at an end thereof, with a string attaching bore 123e. Further, the arm 123b has an end 123f thereof which is engaged with the feeding engagement 110c of the gear arm 110.

A feeding engagement spring 127 is mounted on the feeding engagement shaft 124. The feeding engagement spring 127 has one end 127a thereof which is latched to the spring latch 123d of the feeding engagement lever 123 and the other end 127b which is latched to a boss 125 which is fixedly mounted on the camera body. Thus, the feeding engagement lever 123 is always biased toward a CW direction in the figure. Moreover, the feeding engagement lever 123 is regulated in range of angular movement thereof by the boss 125 and a boss 126 which are fixedly mounted on the camera body.

A changing-over lever shaft 129 is fixedly mounted on a portion 128 of the camera body by a diameter reduced portion 129b thereof. A changing-over lever 130 is fitted over the diameter reduced portion 129b for rotation and for being slightly loose such that the changing-over lever 130 can stimulate or instigate the changing-over lever shaft 129.

Furthermore, a changing-over lever spring 131 which is inserted into the changing-over lever shaft 129 is provided between the changing-over lever 130 and the portion 128 of the camera body so as to urge the changing-over lever 130 always against a flange 129a of the changing-over lever shaft 129. By the changing-over lever spring 131, a changing-over lever 130 is rotated normally in a plane which is perpendicular to a shaft of the changing-over lever shaft 129.

A bore 130b is provided as an opening in one arm of the changing-over lever 130. A string 132 enters the bore 130b and is fixedly mounted thereon. The string 132 has the other end thereof which enters the string attaching bore 123e in the above-described feeding engagement lever 123 so as to be fixedly mounted thereon, while being guided by a center of the string guide shaft 121 which is fixedly mounted on the camera body.

The changing-over engagement lever 130 is regulated in rotation in the CW direction in the figure by a boss 148 that is a stopper which is provided in projection integrally with the camera body. The other arm forward end 130a of the changing-over lever 130 is adapted to be driven by a pair of changing-over cam portions 133b and 133c of a rotary tube 133 to be described later.

Figure 22:
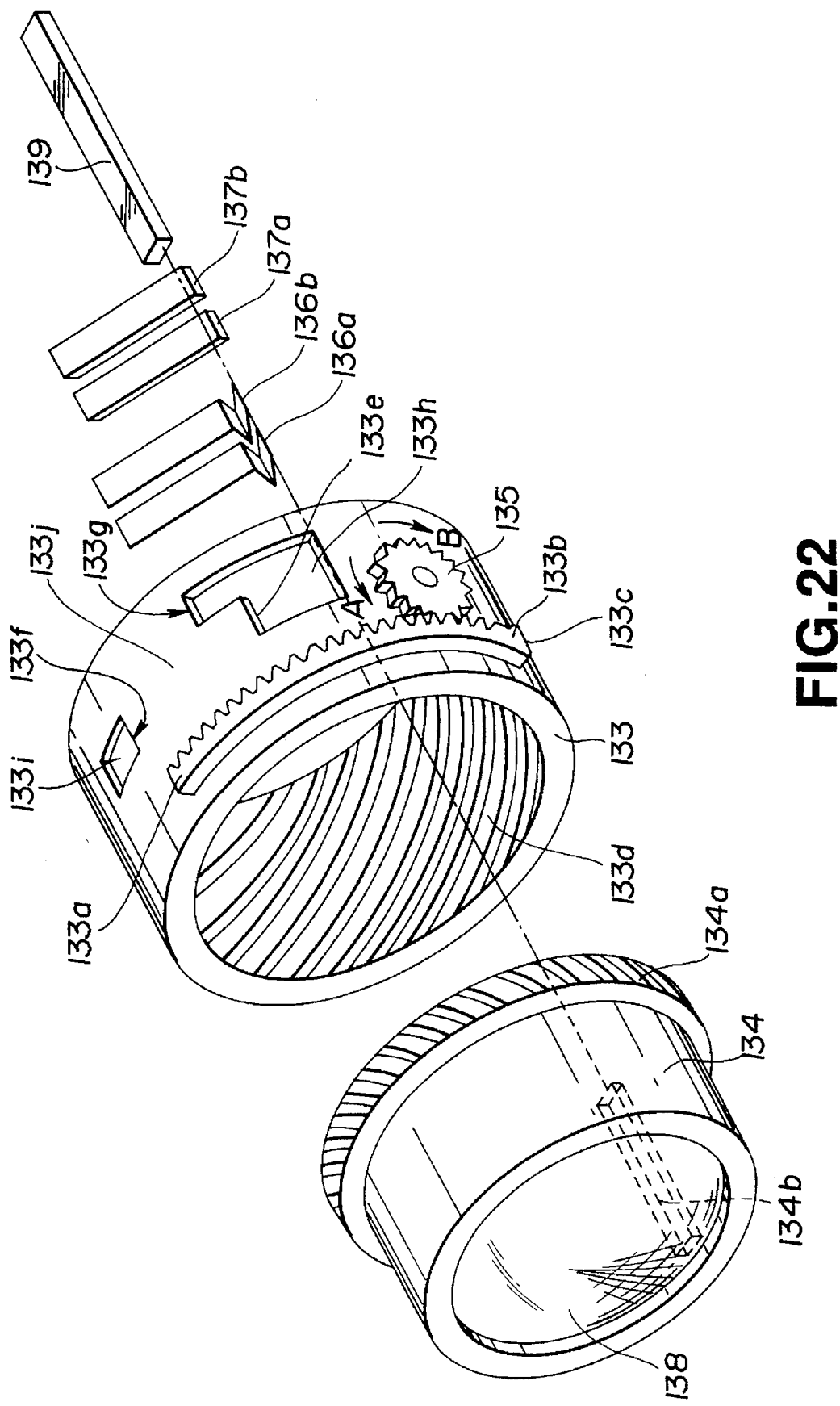
FIG. 22 is a perspective view showing a lens frame in the embodiment partially disassembled.

Next, FIG. 22 is a perspective view showing, in exploded fashion or resolution, a lens frame.

The rotary tube 133 is rotatably mounted on the camera body (not shown). A female helicoid 133d is provided by cutting in an inner peripheral surface of the rotary tube 133.

Over against this, a male helicoid 134a in mesh with the female helicoid 133d in the rotary tube 133 is provided by cutting on the side of the film surface of a linear tube 134 that is the lens frame.

A face gear 133a is integrally formed on the outside of the rotary tube 133. Projections due to changing-over cam portions 133b and 133c for driving the changing-over lever 130 are provided on a termination of the face gear 133a.

A pinion gear 135 is rotatably mounted on the camera body and is adapted to be in mesh with the face gear 133a of the rotary tube 133. The pinion gear 135 is such that the planetary gear 109 drives an idle gear 146 (refer to FIG. 21), and the pinion gear 135 is driven through a gear train (not shown).

A pair of switch-cam recesses 133i and 133h are provided in an outer periphery 133j of the rotary tube 133. Switch cams 133e, 133f and 133g for turning ON/OFF a switch A and a switch B to be described subsequently, or for detecting a position of the rotary tube 133 are formed in ends of the pair of switch-cam recesses 133i and 133h.

The switch A has a movable element 136a which slidingly moves with respect to the switch cam of the rotary tube 133, and a fixed element 137a. Similarly, the switch B has also a movable element 136b and a fixed element 137b.

The linear tube 134 fixes a photographing lens 138 and supports the same. A key groove 134b is formed in an inner peripheral surface of the linear tube 134. The key groove 134b is engaged with a key 139 which is fixedly mounted on the camera body, to thereby regulate (i.e. prevent) rotation of the linear tube 134. Furthermore, a shutter mechanism (not shown) is provided within the linear tube 134.

Figure 29:
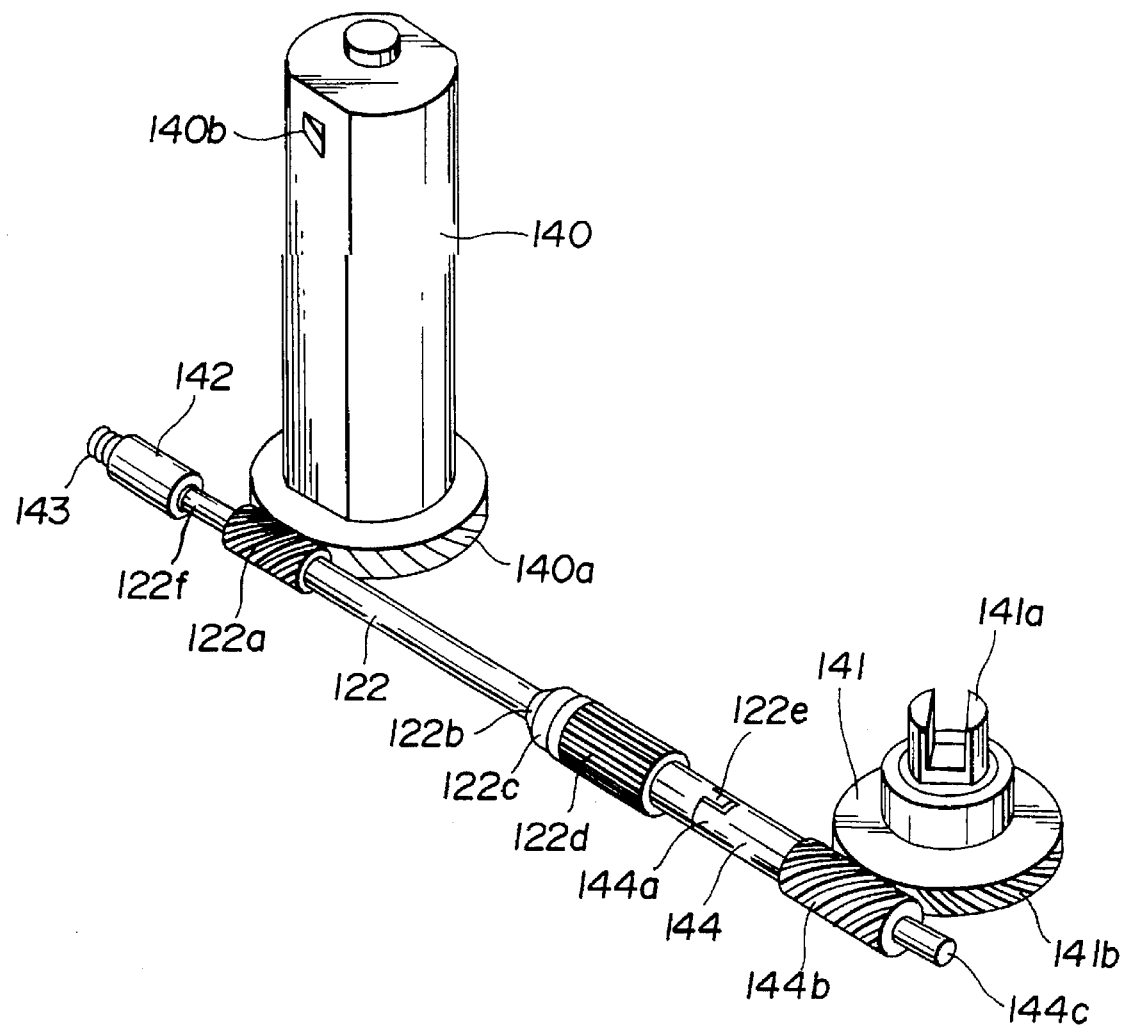
FIG. 29 is a perspective view showing winding and rewinding mechanisms for the film of the embodiment.

FIG. 29 is a perspective view showing a winding and rewinding mechanism for a film.

A spool 140 for winding the film is pivoted on the camera body for angular movement. A pawl 140b which is engaged with perforations in the film is provided in projection on a peripheral surface of the spool 140. A worm wheel 140a slightly larger or greater in diameter than the spool 140 is provided integrally for angular movement on a lower end of the spool 140.

Meanwhile, an R-fork 141 having a pawl 141a which is integrally engaged with the winding shaft of the film cartridge in the rotational direction is pivoted to the camera body for angular movement. A worm wheel 141b slightly greater in diameter than the R-fork 141 is integrally provided on a lower end of the R-fork 141 for angular movement.

The driving shaft 122 is in mesh with the worm wheel 140a of the spool 140 by a worm gear 122a. The driving shaft 122 is pivoted on the camera body for angular movement and for axial movement. The driving shaft 122 is provided with the worm gear 122a. The driving shaft 122 is provided with film end cams 122b and 122c for driving the film-end detecting lever 120 (refer to FIG. 21), substantially at a center of the driving shaft 122. The driving shaft 122 is provided with a spur gear 122d with which the planetary gear 109 (refer to FIG. 21) is in mesh as occasion demands, at the right neighborhood on the drawing. The driving shaft 122 is provided with a coupler 122e which is integrally engaged with an R-shaft 144 to be described subsequently in a rotational direction, on the right end of the drawing. The driving shaft 122 is provided with a left-end surface 122f which is abutted against a shaft presser foot 142 on the left end of the driving shaft 122.

The R-shaft 144 is in mesh with the worm wheel 141b of the R-fork 141 by the worm gear 144b. The R-shaft 144 is so formed as to be coaxial with the driving shaft 122, and is pivoted on the camera body for angular movement and for movement in an axial direction. The R-shaft 144 is provided with a worm gear 144b substantially at a center thereof. A coupler 144a which is engaged with the coupler 122e of the driving shaft 122 is provided on the left end of the R-shaft 144. An end surface 144c for regulating in position the R-fork 141 is provided on the right end of the R-shaft 144.

Here, a lead angle γK of the worm gear 122a of the driving shaft 122 and a lead angle γR of the worm gear 144b of the R-shaft have the following relationship:

$$\gamma K \leq \gamma R$$

The shaft presser foot 142 is provided on the camera body for sliding movement in an axial direction, and is spring-biased toward the driving shaft 122 by a compressive coil spring 143. Normally, the shaft presser foot 142 is abutted against a stopper 145a (refer to FIG. 23) of the camera body.

Operation of the embodiment arranged as described above will next be described.

Figure 38:
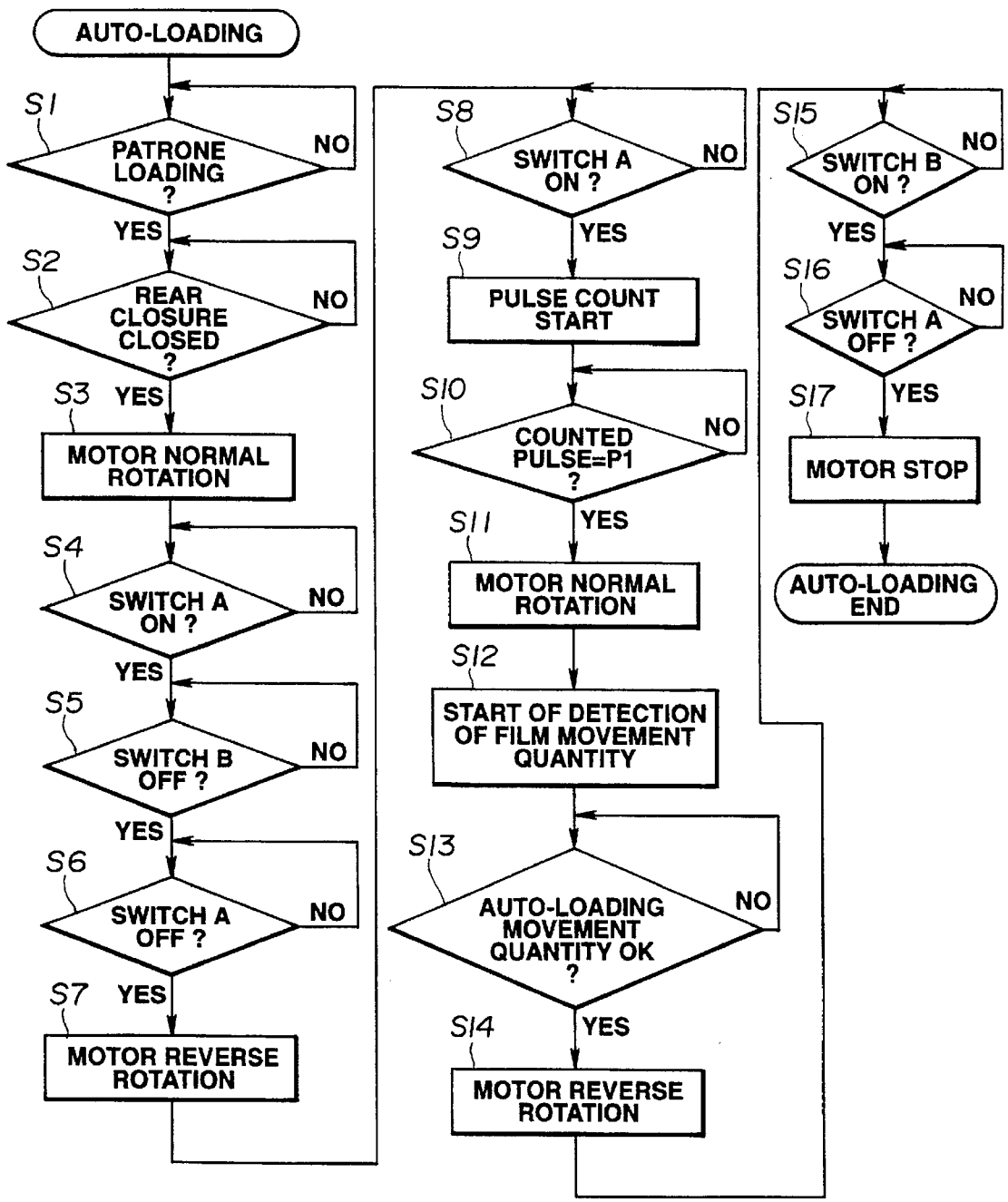
FIG. 38 is a flow chart showing the operation upon auto-loading of the embodiment.

First, operation upon auto-loading will be described with reference to FIG. 38.

Figure 23:
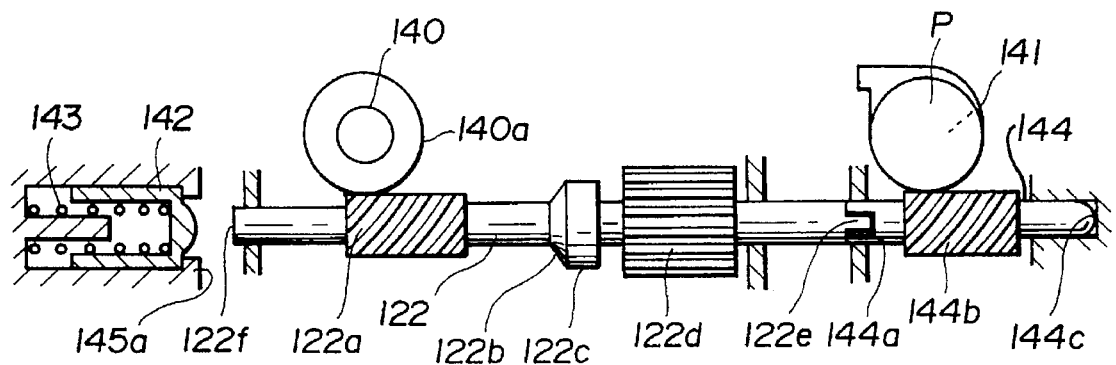
FIG. 23 is a top plan view including a partial cross-section, showing an initial condition of a driving shaft and an R-shaft in the embodiment.
Figure 30A:
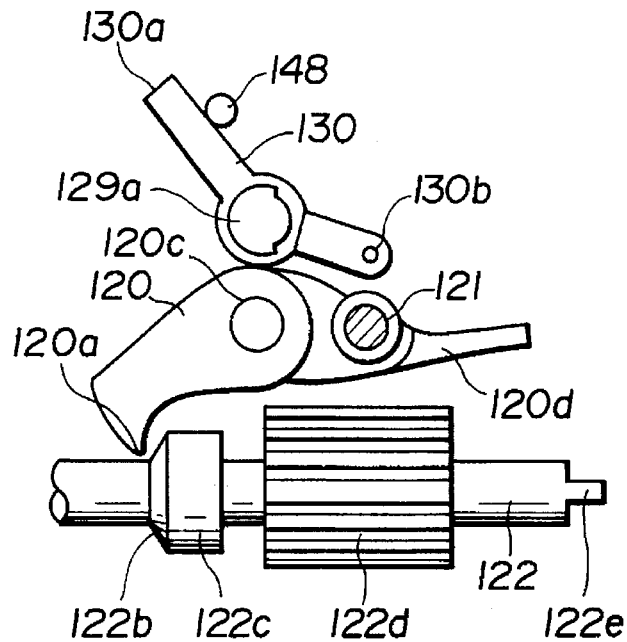
FIG. 30A is a view showing an initial condition of a planetary-gear changing-over mechanism in the embodiment, and is a view in which a portion is viewed from the front.
Figure 30B:
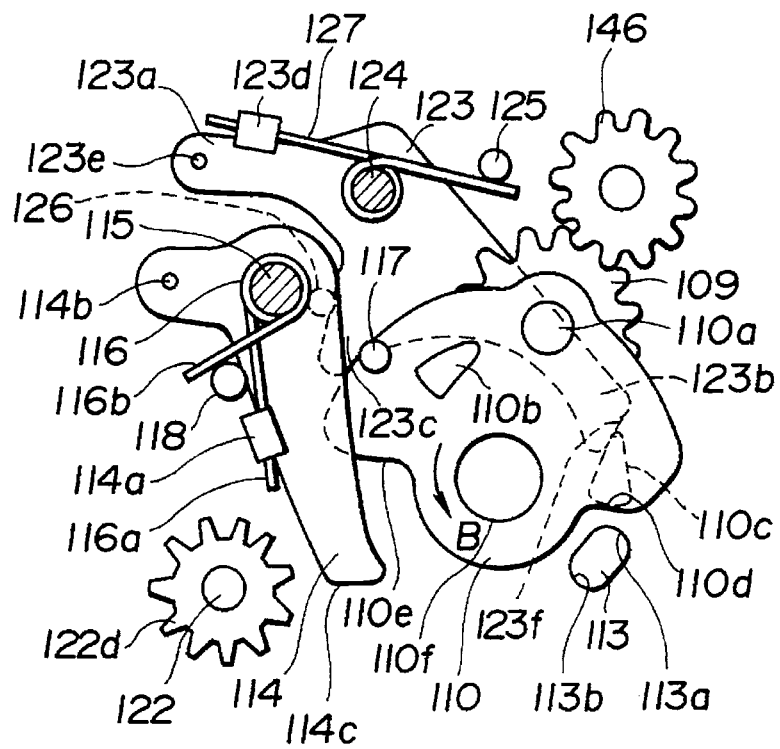
FIG. 30B is a view showing an initial condition of the planetary-gear changing-over mechanism in the embodiment, and is a view in which an another portion is viewed from the side.

In an initial condition, the driving-force transmission mechanism is in a condition shown in FIGS. 23, 30A and 30B.

When it is detected by detecting means (not shown) that the cartridge P (refer to FIG. 23, for example) is loaded and a rear closure (not shown) is closed (S1, S2), control means (not shown) rotates the motor 101 in a direction indicated by an arrow B in FIG. 20 (subsequently, the direction will be referred to as normal rotation.) (S3). Whereupon, an output from the motor 101 is decelerated in speed and is transmitted so that the output gear 108 is also rotated in a direction indicated by the arrow B.

Since friction is applied to the planetary gear 109 which is in mesh with the output gear 108, by the friction washer 112 (refer to FIG. 21), the gear arm 110 is also rotated in the direction of the arrow B shown in FIG. 30B. The feeding engagement 110c of the gear arm 110 is engaged with the end 123f of the arm 123b of the feeding engagement lever 123 so that angular movement of the gear arm 110 is regulated. On the position, the planetary gear 109 drives the idle gear 146. Whereupon, the pinion gear 135 begins to be rotated by a gear train (not shown) in the direction of the arrow B shown in FIG. 22.

Figure 36A:
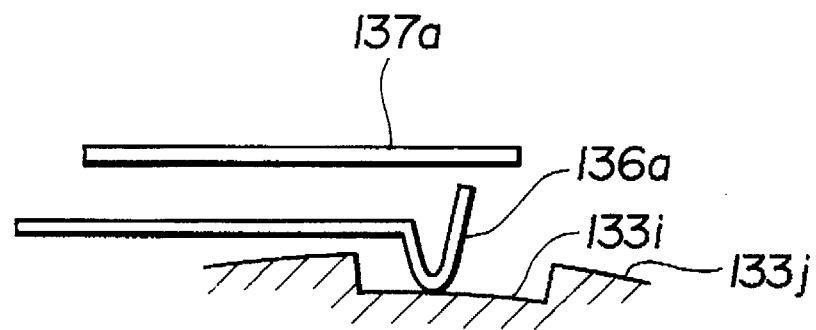
FIG. 36A is a cross-sectional view showing a condition under which a movable element of a switch in the embodiment is engaged with a switch-cam concave in a rotary tube to be moved away from a fixed element so as to be turned OFF.

Under an initial condition, the movable element 136a of the switch A falls into the switch cam recess 133i (FIG. 22) in the rotary tube 133 as shown in FIG. 36A. The switch A is under the OFF-condition. At this time, the movable element 136b of the switch B is abutted against the outer periphery 133j of the rotary tube 133 so that the switch B is under an ON-condition.

Figure 36B:
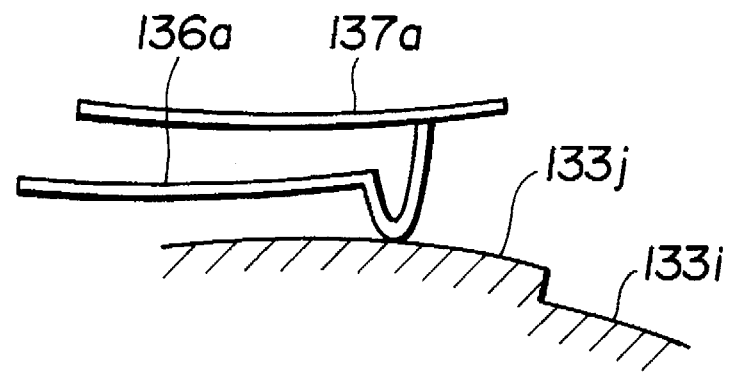

When the pinion gear 135 is rotated in the direction of the arrow B shown in FIG. 22, the linear tube 134 is fed forwardly by mesh between the female helicoid 133d and the male helicoid 134a. When the rotary tube 133 begins to be rotated, the movable element 186a of the switch A is lifted at once by the switch cam 133f as shown in FIG. 36B. Thus, the movable element 136a is in contact with the fixed element 137a so that the switch A is changed to the ON-condition (S4).

When the rotary tube 133 further continues to be rotated so that the linear tube 134 is fed forwardly, the movable element 136b of the switch B is moved toward the switch cam 133g of the rotary tube 133. The movable element 136b which has been lifted by the outer periphery 133j until now and which has been in contact with the fixed element 137b falls into the switch cam recess 133h, whereby the moveable element 136b of switch B is spaced away from the fixed element 137b so as to be under the OFF-condition (S5).

Figure 37A:
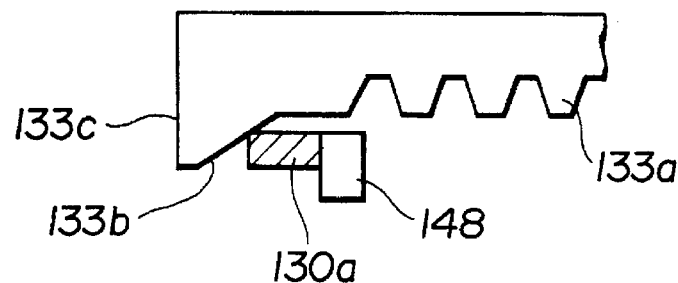
FIG. 37A is a fragmentary enlarged development view showing a positional relationship between a face gear of the rotary tube in the embodiment and a forward end of a changing-over lever.
Figure 37B:
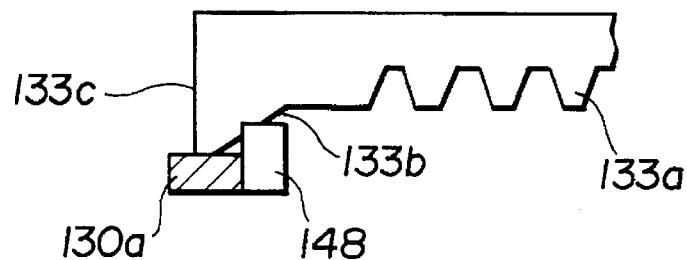
FIG. 37B is a fragmentary enlarged development view showing a positional relationship between the face gear of the rotary tube in the embodiment and the forward end of the changing-over lever.
Figure 37C:
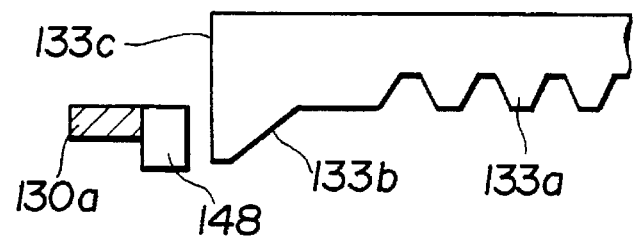
FIG. 37C is a fragmentary enlarged development view showing a positional relationship between the face gear of the rotary tube in the embodiment and the forward end of the changing-over lever.

When the rotary tube 133 is further rotated, the changing-over lever 130 which is under a condition as shown in FIGS. 80A and 37A is such that the forward end 130a thereof is urged in a rearward direction of a photographing optical axis by the changing-over cam 133b of the rotary tube 133 so that the changing-over spring 131 flexes or deflects (refer to FIG. 37B). When the rotary tube 133 is further rotated, the changing-over lever 130 goes past the changing-over cams 133b and 133c of the rotary tube 133, and is returned to the initial condition by the changing-over spring 131 (refer to FIG. 37C).

When the rotary tube 133 is further rotated, the movable element 136a of the switch A falls into the switch cam recess 133h from the switch cam 133e of the rotary tube 133. Thus, the switch A is turned OFF (S6).

By this signal, when the control means (not shown) rotates the motor 101 in the direction of the arrow A shown in FIG. 20 (hereinafter referred to as "reverse rotation") (S7), the gear arm 110 is now rotated in the direction of the arrow A shown in FIG. 31B so that the engagement 110d stops at the position abutted against the abutment 113a of the gear arm stopper 113. At the position, the planetary gear 109 drives the idle gear 146.

Whereupon, the pinion gear 135 is rotated by the gear train (not shown) in the direction of the arrow A shown in FIG. 22. Thus, the rotary tube 133 is rotated so that the movable element 136a of switch A is moved to the outer periphery 133j from the switch cam 133e of the rotary tube 133. Thus, the switch A is under the ON-condition (S8).

Figure 37D:
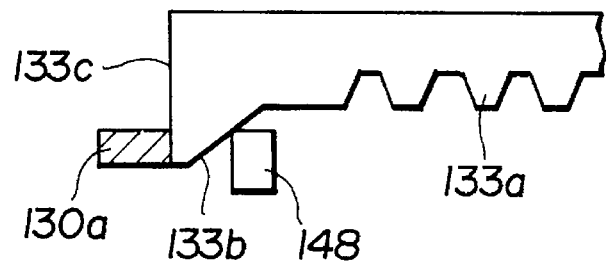
FIG. 37D is a fragmentary enlarged development view showing a positional relationship between the face gear of the rotary tube in the embodiment and the forward end of the changing-over lever.

By this signal, the photo-interrupter 103 shown in FIG. 20 starts to count the number of the bores 102c in the sun gear 102 (S9) to continue the rotation of the motor 101 until the count value reaches P1 pulses set previously. Whereupon, the changing-over cam 133c of the rotary tube 133 pushes the forward end 130a of the changing-over lever 130 as shown in FIG. 37D to rotate the changing-over lever 130 in a CCW direction in FIG. 21.

Whereupon, an arm of the changing-over lever 130 on the opposite side is moved upwardly in FIG. 21 to pull the string 132. Since the string 132 is wound around the string guide shaft 121 through half revolution, the string 132 pulls down the other end of the string. Thus, the arm 123a of the feeding engagement lever 123 is pulled down, that is, the feeding engagement lever 123 is rotated in the CCW direction in FIG. 21.

Figure 32A:
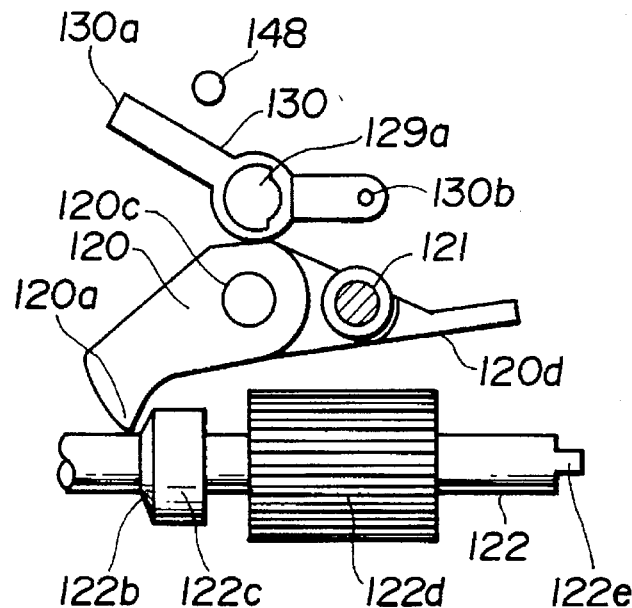
FIG. 32A is a view showing a condition under which the changing-over lever is rotated to the left and is moved away from the boss so that a feeding engagement lever is rotated to the left, in FIG. 30A.
Figure 32B:
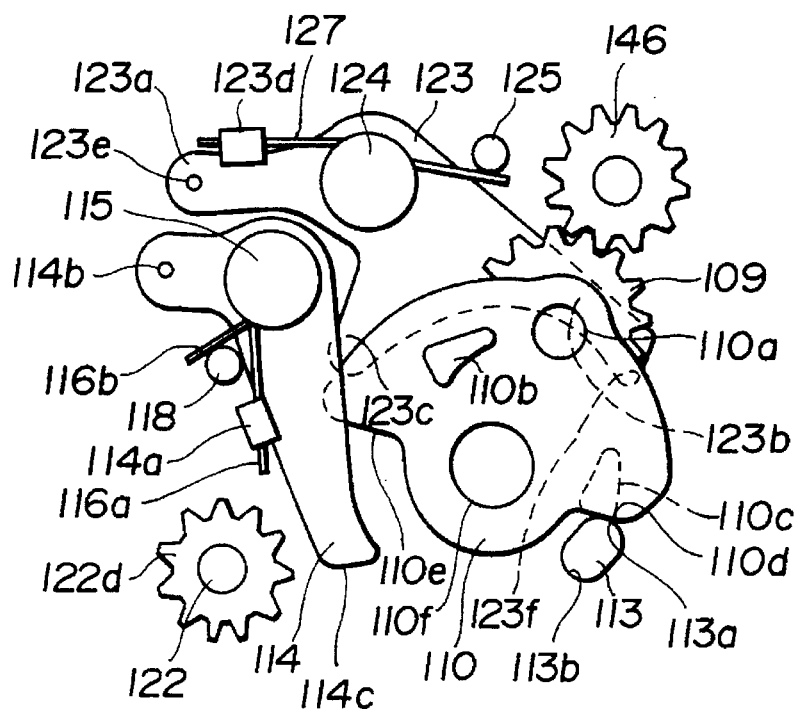
FIG. 32B is a view showing a condition under which the changing-over lever is rotated to the left and is moved away from the boss so that the feeding engagement lever is rotated to the left, in FIG. 30B.

At the time when the number of pulses from the time when the switch A is turned on becomes the P1 pulses (S10), the control means (not shown) changes over the rotational direction of the motor 101 to normally rotate the same (S11). At this time, a condition or state is brought to the state as shown in FIGS. 32A and 32B. The feeding engagement lever 123 is brought to a position which is retreated from a position on a rotary locus of the feeding engagement 110c of the gear arm 110.

Figure 33A:
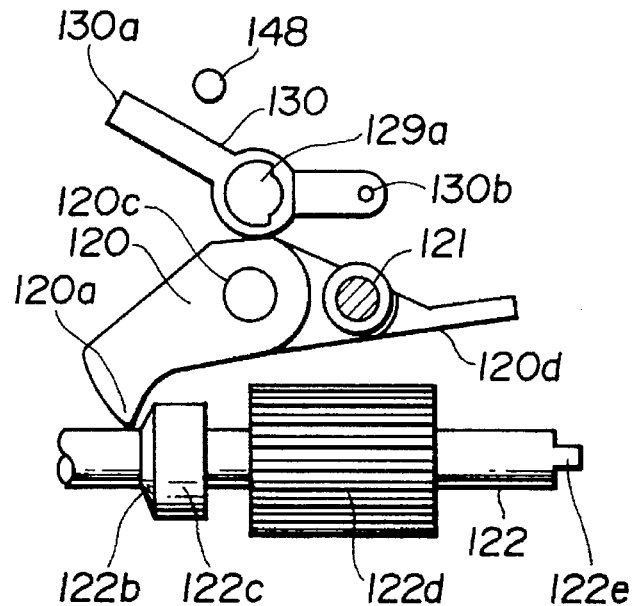
FIG. 33A is a view showing a condition under which a gear arm is rotated in a direction indicated by an arrow B so that the gear arm is abutted against a gear-arm stopper, in FIG. 30A.
Figure 33B:
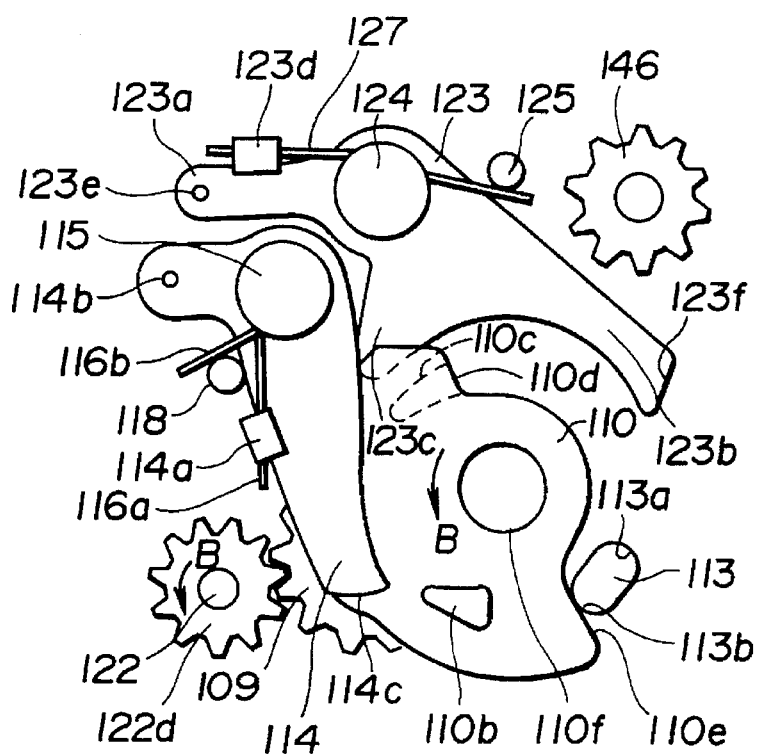
FIG. 33B is a view showing a condition under which the gear arm is rotated in a direction indicated by the arrow B so that the gear arm is abutted against the gear-arm stopper, in FIG. 30B.

Since the control means (not shown) changes over the rotational direction of the motor 101, the gear arm 110 is now rotated in a direction indicated by the arrow B in FIG. 33(B) so that the engagement 110e of the gear arm 110 stops at a position abutted against the abutment 113b of the gear arm stopper 113.

At this position, the planetary gear 109 is in mesh with the spur gear 122d of the driving shaft 122, to rotatively drive the driving shaft 122 in the direction indicated by the arrow B in FIG. 33(B).

Subsequent operation will be described while referring to FIGS. 23 to 28 as occasion demands.

When the motor 101 continues to be normally rotated (a condition in FIG. 23 is an initial condition), the arrangement is such that, since a linear movement load of the driving shaft 122 and the R-shaft 144 is lighter than a rotational load of the spool 114 and the R-fork 141, thrust force is generated on both the shafts 122 and 144 by the lead angles of the worm gear 122a and the worm gear 144b so that both shafts 122 and 144 are moved to the left in the figure.

Here, if the lead angle γK of the worm gear 122a of the driving shaft 122 and the lead angle γR of the worm gear 144b of the R-shaft 144 are γK=γR, neither the spool 140 nor the R-fork 141 are rotated, and the two (2) shafts 122 and 144 are moved to the left while being rotated, at equal speed.

Further, if the lead angle is in the relationship of γK<γR, the driving shaft 122 is pushed to the left by the R-fork 141. The spool 140 is rotated to the right in the figure. As a result, the two (2) shafts 122 and 144 are moved while being rotated at equal speed.

Over against this, if the lead angle is in the relationship of γK>γR, the moving speed of the driving shaft 122 becomes faster than that of the R-shaft 144. The couplers 122e and 144a are spaced from each other. The R-shaft 144 cannot be driven. Accordingly, this mechanism cannot bring into existence. In view of this, the relationship of γK≦γR is set as described previously.

Figure 24:
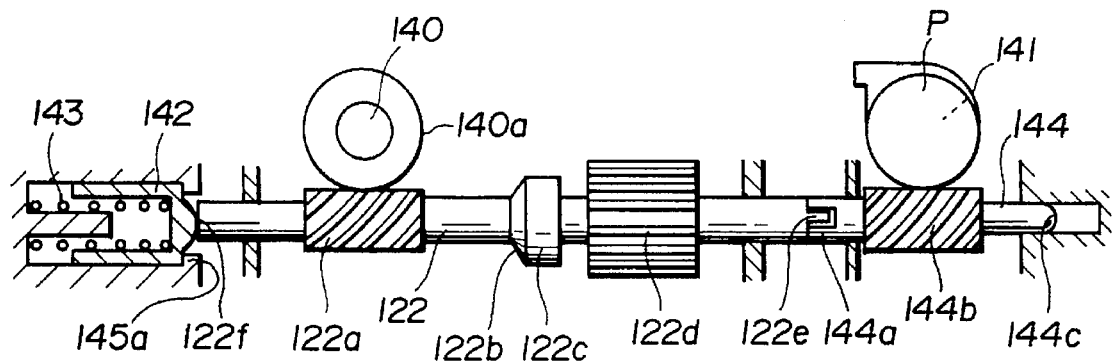
FIG. 24 is a top plan view including a partial cross-section, showing a condition under which a left-hand end surface of the driving shaft is abutted against a shaft presser foot in FIG. 23.

The two (2) shafts 122 and 144 are moved to the left so that the left end surface 122f of the driving shaft 122 is abutted against the shaft presser foot 142, as shown in FIG. 24. By the shaft-presser-foot spring 143 that is a spring which has biasing force thereof stronger than the thrust force in the axial direction at this time, since the shaft presser foot 142 is biased in the right-hand direction, movement of the shaft in the left-hand direction stops under a condition illustrated in FIG. 24.

Figure 25:
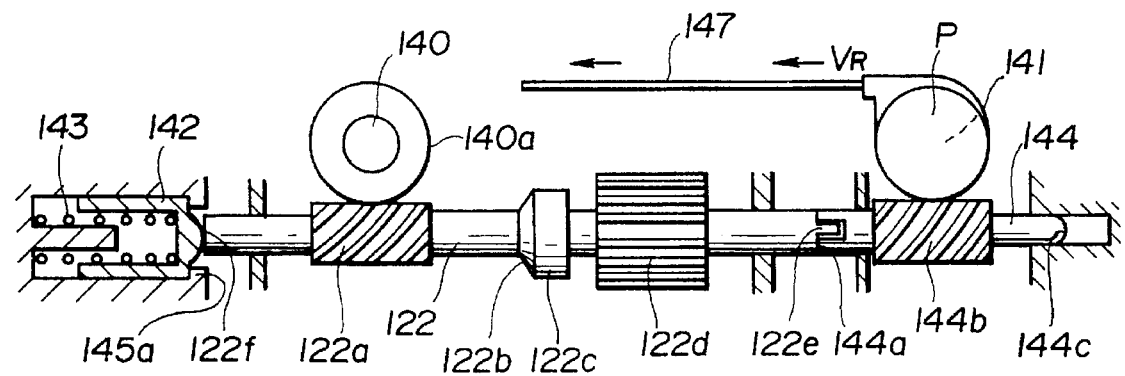
FIG. 25 is a top plan view including a partial cross-section, showing a condition under which a film begins to be fed from a film cartridge in FIG. 23.

When rotation of the motor 101 further continues, the spool 140 and the R-fork 141 start to be rotated to the left in the figure. By the fact that the R-fork 141 is rotated to the left, the film 147 within the cartridge P is fed out. The film 147 passes through the film holder of the camera body (not shown) at a speed $V_R$ (FIG. 25).

Figure 26:
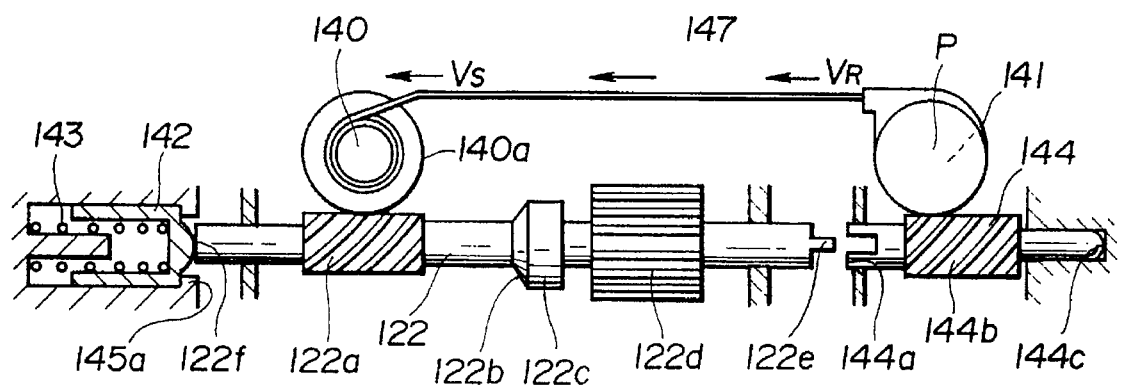
FIG. 26 is a top plan view including a partial cross-section, showing a condition under which a coupler of the driving shaft and a coupler of an R-shaft are spaced apart from each other so that the film is taken up about a spool, in FIG. 23.
Figure 27:
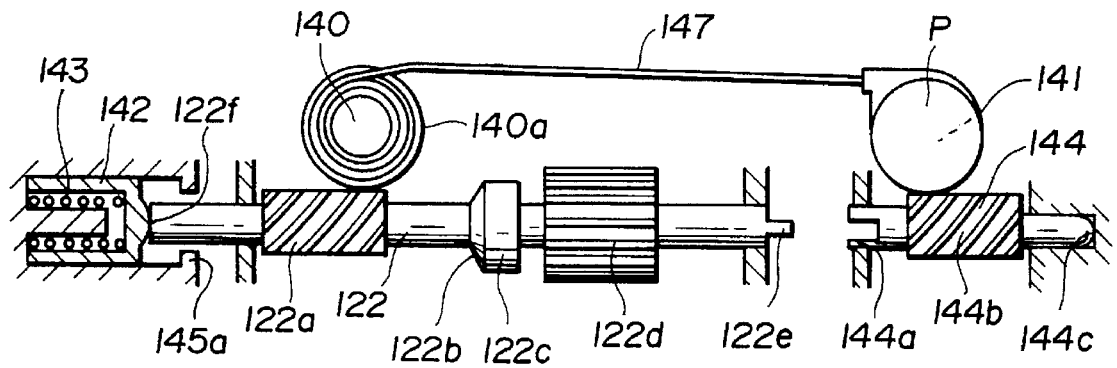
FIG. 27 is a top plan view including a partial cross-section, showing a condition under which the driving shaft pushes or urges a shaft presser foot to charge a shaft presser-foot spring, in FIG. 23.
Figure 28:
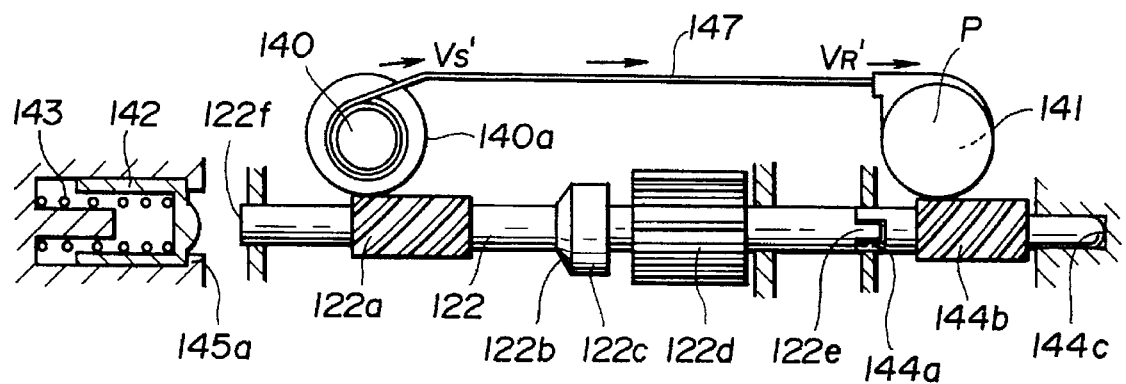
FIG. 28 is a top plan view including a partial cross-section, showing a condition under which the coupler of the driving shaft and the coupler of the R-shaft are engaged with each other and are integrally rotated to rewind the film, in FIG. 23.

When the perforations (not shown) in the forward end of the film are caught in the pawl 140b of the spool 140 (refer to FIG. 29), the film 147 is taken up by the spool 140 at a speed $V_S$ as shown in FIG. 26. Here, the arrangement is such that the film winding speed $V_S$ due to the spool 140 and the film feeding speed $V_R$ due to the R-fork 141 are in the relationship of $V_S \geq V_R$. For this reason, the R-fork 141 is driven by the film 147. Accordingly, the R-shaft 144 is moved to the right in the figure by the R-fork 141 so that the pair of couplers 122e and 144a are spaced away from each other as shown in FIG. 26.

Thus, the film 147 is taken up by the spool 140, and the R-fork 141 is rotated in being driven by the film 147. The R-shaft 144 is rotated at a position where the end surface 144c is abutted against the camera body. Such condition illustrated in FIG. 26 is a so-called well-known spool drive.

Moreover, at the time when it is detected that the quantity of film movement is fed through the preset quantity or the previously set quantity by film-movement-quantity detecting means (not shown) (S12, S13), the control means (not shown) reversely rotates the motor 101 (S14). Whereupon, the gear arm 110 is now rotated in the CW direction in the figure, and is again moved to a state or condition as shown in FIG. 32(B). When the planetary gear 109 is in mesh with the idle gear 146 to drive the same, the pinion gear 135 is rotated in a direction indicated by an arrow A in FIG. 22. The rotary tube 133 is rotated in the CW direction in the figure. The changing-over cams 133c and 133b rotate the changing-over lever 130 further in the CCW direction in the figure and pass over the forward end 130a of the changing-over lever 130.

Whereupon, since the changing-over lever 130 is made free, the feeding engagement lever 123 is rotated in the CW direction in FIG. 21 by the feeding engagement spring 127. The string attachment bore 123e in the feeding engagement lever 123 is moved upwardly. Accompanied with this, the string 132 is pulled upwardly. The string 132 which is attached to the changing-over lever 130 is pulled downwardly through the string guide shaft 121. Accordingly, the changing-over lever 130 is rotated in the CW direction in FIG. 21, and stops at a position abutted against the boss 148 that is an initial-position stopper (refer to FIG. 21).

When the motor 101 continues to be further rotated so that the rotary tube 133 is rotated, the switch B becomes an ON condition by the switch cam 133g of the rotary tube 133 (S15). When the motor 101 continues to be driven as it is so that the linear tube 134 is moved rearwardly, the switch A is now turned OFF by the switch cam 133f of the rotary tube 133 (S16). The control means (not shown) receives this signal, and stops the motor 101 (S17). Thus, the linear tube 134 is returned to the initial position, and the collapsible mounting ends. A sequence until now is the automatic loading sequence.

Figure 39:
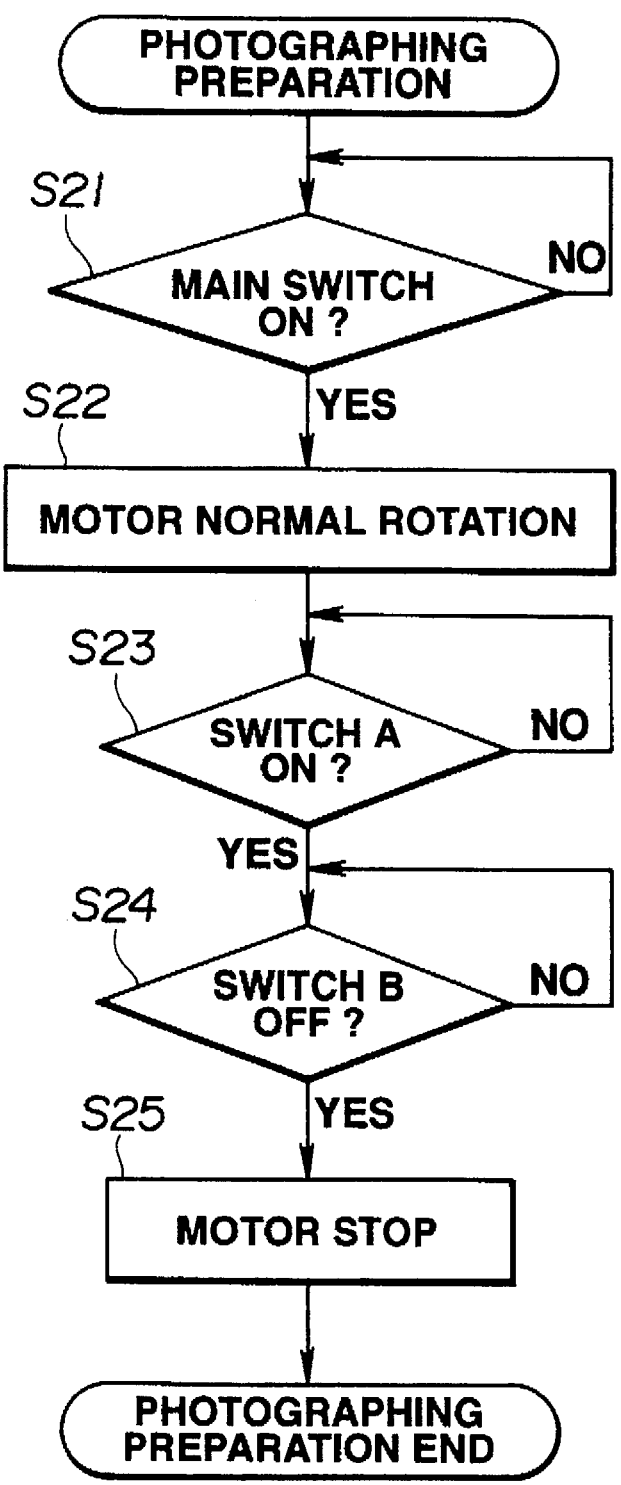
FIG. 39 is a flow chart showing the operation of photographing preparation in the embodiment.

A sequence in which a main switch (not shown) is operated so as to be turned ON to enter the photographing preparation will next be described with reference to FIG. 39.

When the main switch is turned ON (S21) so that the control means (not shown) rotates the motor 101 in the direction indicated by the arrow B in FIG. 20 (S22), the planetary gear 109 is in mesh with the idle gear 146 at a position where the feeding engagement 110c of the gear arm 110 is abutted against the end 123f of the feeding engagement lever 123 (refer to FIG. 30B), so that the pinion gear 135 is rotated in the direction indicated by the arrow B in FIG. 22. When the rotary tube 133 is rotated so that the linear tube 134 is moved forwardly, the switch A is first turned ON by the rotary-tube switch cam 133f (S23). The switch B is then turned OFF by the rotary-tube switch cam 133g (S24).

At the time when the switch B is turned OFF, the control means (not shown) stops the motor 101 (S25). A position of the linear tube 134 becomes a waiting position short of a photographing range (a photographing preparation condition or state).

Figure 40:
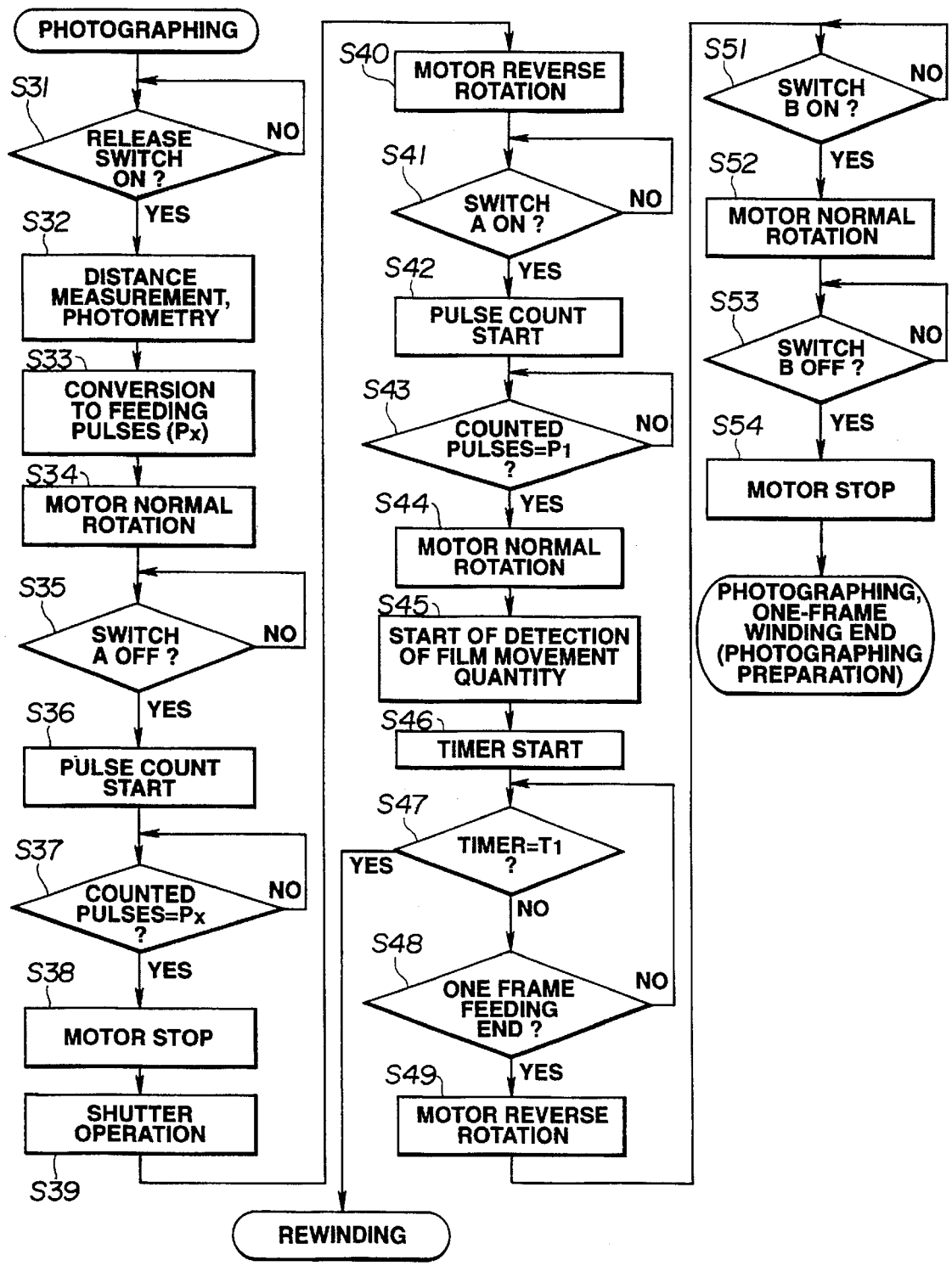
FIG. 40 is a flow chart showing the operation of photographing and one-frame winding in the embodiment.

A sequence at the time when a release button (not shown) is depressed to perform photographing and winding of or through one frame will next be described with reference to FIG. 40.

When a release button is depressed, the release switch is turned ON (S31), and distance measurement and photometry are first performed (S32). The quantity of feeding is computed on the basis of distance measurement data and is converted to the feeding pulses Px (S33). Subsequently, the motor 101 is normally rotated so as to be brought to the initial position (S34). The changing-over lever 130 is such that the forward end 130a thereof is pushed rearwardly of the photographing optical axis by the changing-over cam 133b of the rotary tube 133 so that the changing-over lever spring 131 flexes or is deflected. The rotary tube 133 is further rotated, and the changing-over cam 133b of the rotary tube 133 passes over. The changing-over lever 130 is returned to the initial position by the changing-over lever spring 131.

The switch A is turned OFF at a portion of the switch cam 133e of the rotary tube 133 (S35). On the basis of this signal, the aforesaid photo-interrupter 103 starts pulse count (S36). At the time when the count value of the photo-interrupter 103 reaches the number of pulses Px (S37), the control means (not shown) stops the motor 101 (S38). Thus, the photographing lens 138 is fed to the position in focus to a subject.

Whereupon, the shutter mechanism (not shown) is driven so that the photographing ends (S39). After a signal of the shutter end has been received, the control means (not shown) reversely rotates the motor 101 in the direction indicated by the arrow A in FIG. 20 (S40). Whereupon, the gear arm 110 is now rotated in the direction indicated by the arrow A in FIG. 31B. Rotation of the gear arm 110 stops at the position where the engagement 110d of the gear arm 110 is abutted against this abutment 113a of the gear arm stopper 113. At the position, the planetary gear 109 drives the idle gear 146.

Whereupon, the pinion gear 135 is rotated by the gear train (not shown) in the direction indicated by the arrow A in FIG. 22. Thus, the rotary tube 133 is rotated so that the switch A becomes the ON condition by the switch cam 133e of the rotary tube 33 (S41).

By this signal, the photo-interrupter 103 shown in FIG. 20 starts to count the number of bores 102c in the sun gear 102 (S42), and continues to rotate the motor 101 until the count value becomes P1 pulses which is set beforehand. Whereupon, the changing-over cam 133c of the rotary tube 133 pushes the forward end 130a of the changing-over lever 130 as shown in FIG. 37D to rotate the changing-over lever 130 in the CCW direction in FIG. 21.

Whereupon, the other end of the changing-over lever 130 is moved upwardly to pull up the string 132. Since the string 132 is wound half about the string guide shaft 121, the other end of the string is pulled down. Thus, the portion of the feeding engagement lever 123 adjacent to the string attachment bore 123e is moved downwardly.

When the number of pulses from the time when the switch A is turned ON becomes the P1 pulses (S43), the control means (not shown) changes over the rotational direction of the motor 101 to normally rotate the same (S44). Detection of the quantity of movement of the film 147 starts (S45). At this time, a condition becomes the condition as shown in FIG. 13. The feeding engagement lever 123 becomes a position retreated from a position on the rotary locus of the feeding engagement 110c of the gear arm 110.

Since the control means (not shown) changes over the rotative direction of the motor 101, the gear arm 110 is now rotated in the direction indicated by the arrow B in FIG. 33(B), and stops at the position where the engagement 110e of the gear arm 110 is abutted against the abutment 113b of the gear arm stopper 113.

At this position, the planetary gear 109 is in mesh with the spur gear 122d of the driving shaft 122 to rotatively drive the driving shaft 122 in the direction indicated by the arrow B in FIG. 33(B).

Since the driving shaft 122 and the R-shaft 144 become the condition as shown in FIG. 26, the driving shaft 122 rotates the spool 140 in the winding direction whereby the film 147 is wound. Since the biasing force of the shaft presser-foot spring 143 is stronger than the thrust force due to the worm gear 122a of the driving shaft 122 by the motor torque which is required for the winding at this time, the driving shaft 122 is only rotated under the condition as shown in FIG. 26.

When the timer (not shown) starts from the time when the rotative direction of the motor 101 is changed over to normal rotation (S46), and it is detected (S47, S48) that the film is fed through one frame by film moving-quantity detecting means (not shown) within the time T1 required for feeding one frame, the control means (not shown) reversely rotates the motor 101 (S49). Whereupon, the gear arm 110 is rotated to the condition as shown in FIG. 32(B) and stops. The pinion gear 135 is rotated in the direction indicated by the arrow A through the idle gear 146. The rotary tube 133 is rotated in the CW direction in FIG. 22. The changing-over cams 133c and 133d rotate the changing-over lever 130 further in the CCW direction in FIG. 21 and pass the forward end 130a of the changing-over lever 130.

Figure 31A:
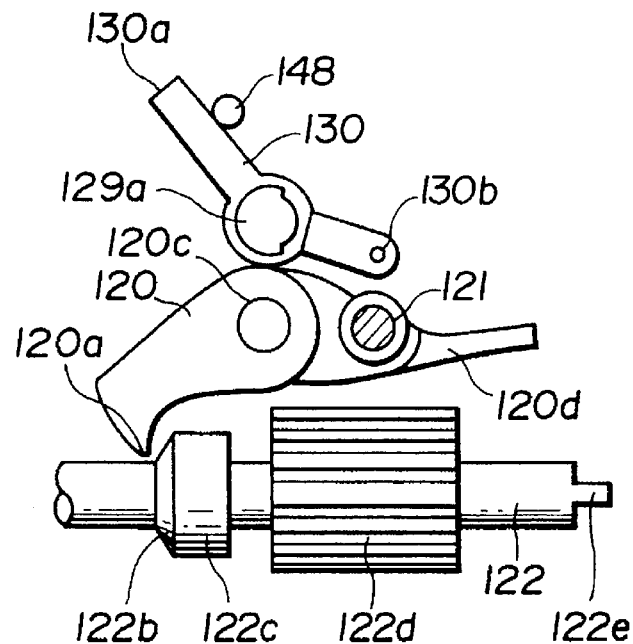
FIG. 31A is a view showing a condition under which a changing-over lever is abutted against a boss, and a gear arm is rotated in a direction indicated by an arrow A so that the gear arm is abutted against a gear arm stopper, in FIG. 30A.

Whereupon, since the changing-over lever 130 becomes free, the feeding engagement lever 123 is rotated in the CW direction in FIG. 21 by the feeding engagement spring 127. The string attachment bore 123e in the feeding engagement lever 123 is moved upwardly. In keeping with this, the string 132 is pulled upwardly. Since the string 132 which is attached to the changing-over lever 130 is pulled through the string guide shaft 121, the changing-over lever 130 is rotated in the CW direction in FIG. 21 and stops at a position where the changing-over lever 130 is abutted against the boss 148 that is an initial-position stopper as shown in FIG. 31A.

When the motor 101 further continues to be rotated so that the rotary tube 133 is rotated, the switch B becomes an ON-condition by the switch cam 133g of the rotary tube 133 (S51). When the control means (not shown) receives this signal and changes over the motor 101 to normal rotation (S52), the control means rotates the rotary tube 133 under the condition as shown in FIG. 30B. When the switch B is turned OFF by the switch cam 133g of the rotary tube 133, the control means (not shown) stops rotation of the motor 101 (S53, S54).

Under this condition, a condition again becomes the aforementioned photographing preparation condition. Here, if the release switch (not shown) is further turned ON, the aforesaid sequence is again performed.

Figure 31B:
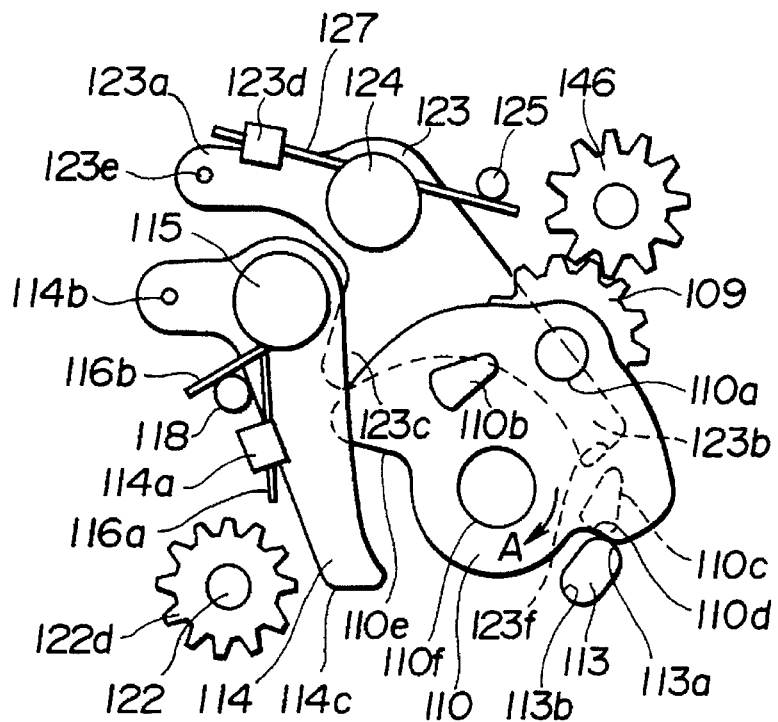
FIG. 31B is a view showing a condition under which the changing-over lever is abutted against the boss, and the gear arm is rotated in a direction indicated by an arrow A so that the gear arm is abutted against the gear arm stopper, in FIG. 30B.

Furthermore, when the main switch (not shown) is here operated so that a main power source for the camera is turned OFF, the control means (not shown) rotates the motor 101 in the direction indicated by the arrow A so that the condition becomes a condition as shown in FIG. 31B. When the rotary tube 133 is rotated in the direction indicated by the arrow A in FIG. 22, the switch B is turned ON by the switch cam 133g of the rotary tube 133. The linear tube 134 continues to be moved rearwardly. The switch A is now turned OFF by the switch cam 133f. The motor 101 receives this signal and stops.

Thus, the linear tube 134 is returned to the initial position, and collapsible mount ends.

Figure 41:
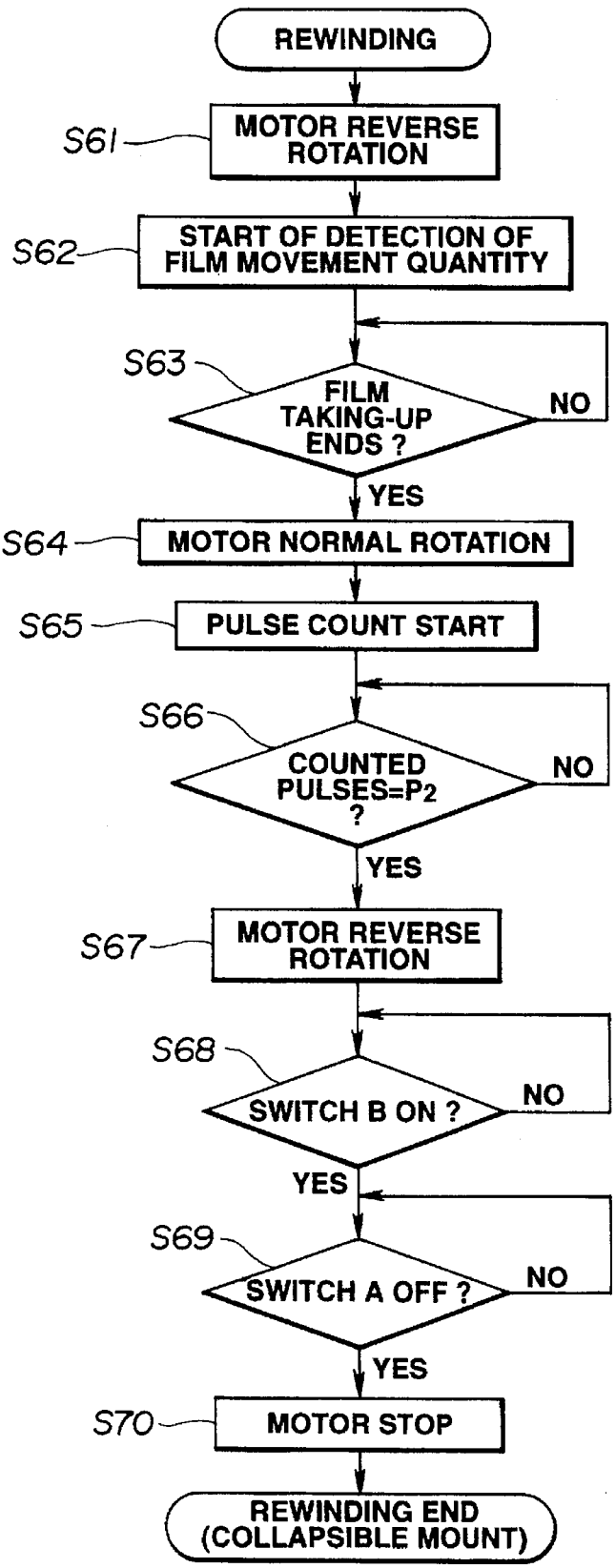
FIG. 41 is a flow chart showing the operation of rewinding in the embodiment.

Operation of rewinding will next be described with reference to FIG. 41.

When the film ends at the time when the aforesaid shutter sequence of the photographing through the single frame ends, and the motor 101 is rotated in the normal direction so that the film 147 is wound under a condition shown in FIGS.

33A and 33B (at this time, the driving shaft 122 and the R-shaft 144 are in the position as shown in FIG. 26), the rotation of the motor 101 stops (a lock condition), and the starting current continues to flow through the motor 101 so that the motor 101 is in a condition where the starting torque is generated.

Upon normal winding, the biasing force of the shaft presser-foot spring 143 is stronger than the thrust force of the worm gear 122a due to the motor torque upon winding. Accordingly, the driving shaft 122 is only rotated at the position illustrated in FIG. 26. However, the motor starting torque under this lock condition is set several times larger than the normal winding torque. Further, the capacity of the shaft presser-foot spring 143 is set weaker than the thrust force due to the worm gear 122a of the driving shaft 122 upon generation of the motor starting torque. Accordingly, if the motor 101 continues to generate the starting torque at the film end, the driving shaft 122 urges the shaft presser foot 142 while charging the shaft presser-foot spring 143, and the driving shaft 122 is moved from the condition shown in FIG. 26 to the condition shown in FIG. 27.

By the movement of the driving shaft 122, the forward end 120a of the film-end detecting lever 120 is lifted upwardly in FIG. 21 by the film end cam 122b of the driving shaft 122. The forward end 120a becomes a condition running onto the film end cam 122c.

Figure 34A:
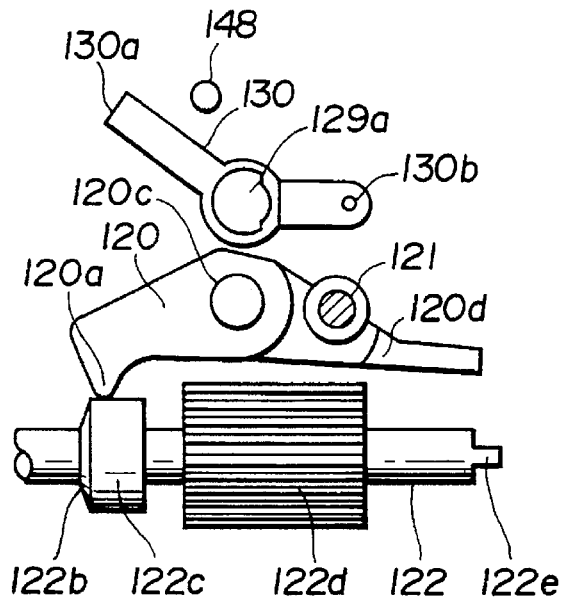
FIG. 34A is a view showing a condition under which a film-end detecting lever is abutted against a film-end cam, in FIG. 30A.
Figure 34B:
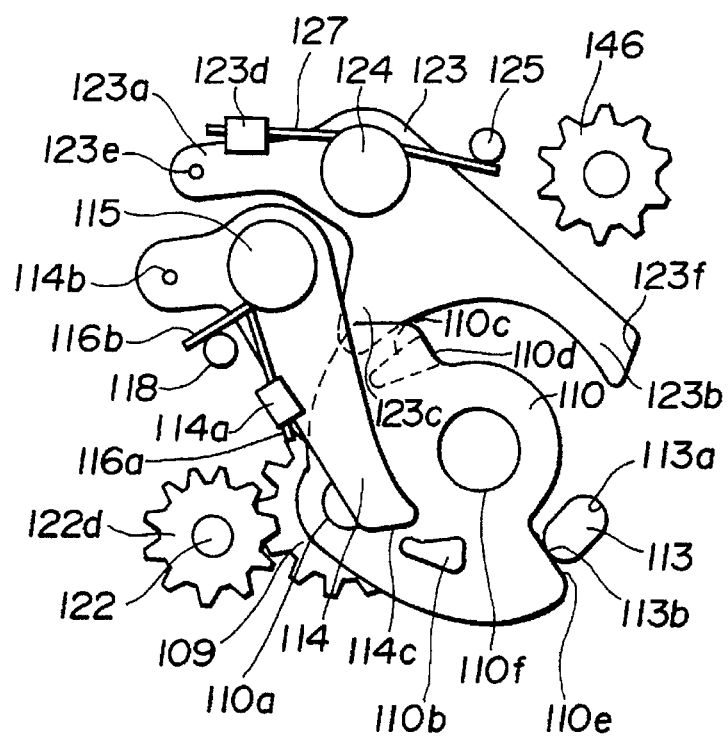
FIG. 34B is a view showing a condition under which the film-end detecting lever is abutted against the film-end cam, in FIG. 30B.

By the angular movement of the film-end detecting lever 120, the rewinding engagement lever 114 which is pulled down from the strip element 119 which is mounted on the other end of the film-end detecting lever 120 and to which the other end of te strip element 119 is attached is rotated in the CCW direction in FIGS. 34A and 34B while charging the rewinding release spring 116.

Even if the timer from the time when the motor 101 is changed over to the normal rotation becomes T1 described above, when the quantity of film movement due to the film moving-quantity detecting means is unsatisfied to one frame, the control means (not shown) changes over the rotational direction of the motor 101 to a direction of reverse rotation (S61). When the reverse rotation of the motor 101 starts, detection of the moving quantity of the film 147 starts by the film moving-quantity detecting means (not shown) (S62).

Figure 35A:
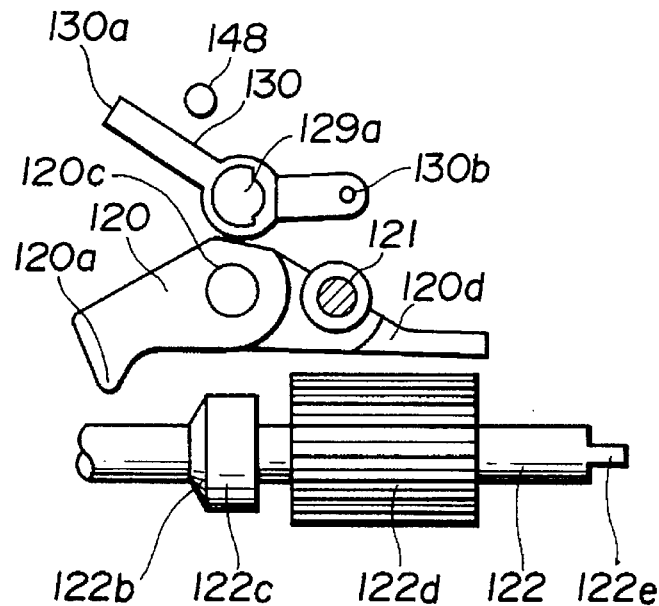
FIG. 35A is a view showing a condition under which a rewinding engagement of a gear arm is abutted against a spring-latching portion of a rewinding engagement lever, in FIG. 30A.
Figure 35B:
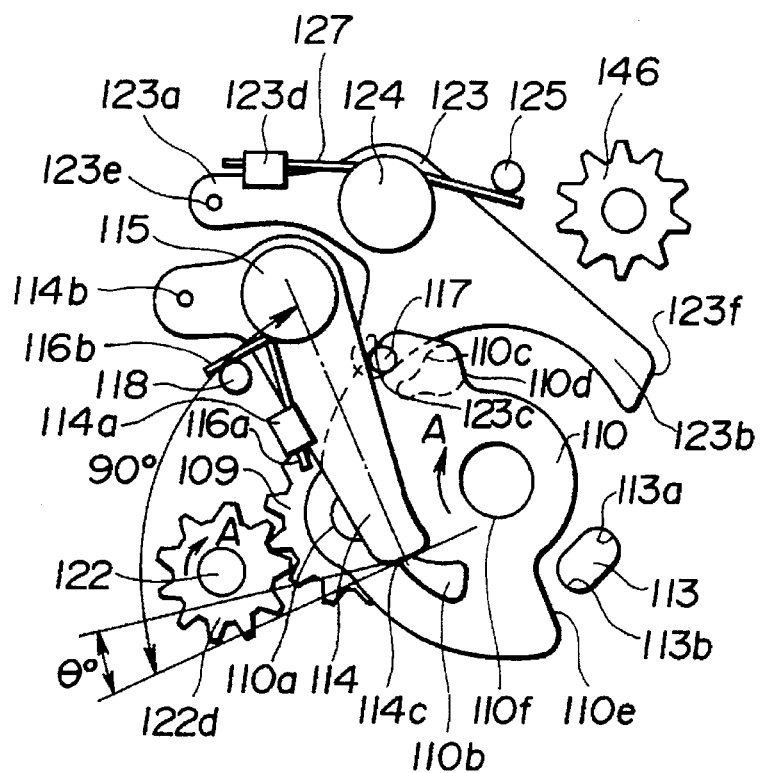
FIG. 35B is a view showing a condition under which the rewinding engagement of the gear arm is abutted against the spring-latching portion of the rewinding engagement lever, in FIG. 30B.

Whereupon, by the friction of the aforementioned friction washer 112, the gear arm 110 is rotated in the direction indicated by the arrow A in FIG. 35B. The rewinding engagement 110b stops at the position where the rewinding engagement 110b is abutted against the end 114c of the rewinding engagement lever 114.

When the motor 101 continues to be rotated so that the driving shaft 122 is rotated in the direction indicated by the arrow A in FIG. 35B, the driving shaft 122 is moved in the right direction by the thrust force due to the worm gear 122a of the driving shaft 122. The film end cams 122b and 122c of the driving shaft 122 are retreated from the forward end 120a of the film-end detecting lever 120. The film-end detecting lever 120 can be rotated in the CCW direction in FIG. 21.

Moreover, under the condition illustrated in FIG. 35B, the rewinding engagement lever 114 is biased in the CW direction in FIG. 35B by the rewinding release spring 116 and intends to be angularly moved in such a direction as to cancel engagement of the rewinding engagement 110b of the gear arm 110. However, by the friction applied to the planetary gear 109, the rotative torque in the direction indicated by the arrow A in FIG. 35B is generated on the gear arm 110 so that the rewinding engagement 110b of the gear arm 110 continues to urge the end 114c of the rewinding engagement lever 114.

Inclination of θ° shown in FIG. 35B (about 10°, for example) is had by the end 114c of the rewinding engagement lever 114. Accordingly, force which is rotated in the CCW direction in FIG. 35B is applied to the rewinding engagement lever 114 against the biasing force of the rewinding release spring 116 so that the rewinding release lever 114 stops at the position abutted against the stopper 117.

By movement of the driving shaft 122 in the right direction, when the engagement coupler 122e of the driving shaft 122 is engaged with the engagement coupler 144a of the R-shaft 144 so that the driving shaft 122 and the R-shaft 144 are rotated together (refer to FIG. 28), the spool 140 and the R-fork 141 are respectively rotated in the rewinding direction. The film 147 is taken up into the cartridge P by the R-fork 141.

Here, the rewinding movement speed $V_R$ of the film 147 due to the R-fork 141 is set to the relationship of $V_S \geq V_R$ that is the relationship slower than the speed $V_S$, by which the film 147 is fed in the rewinding direction by the spool 140. Accordingly, the film 147 which is wound in intimate contact around the spool 140 is slackened. The pawl 140b of the spool 140 comes out from the perforations in the film 147. Thus, the film 147 is rewound under a so-called well-known R-fork drive condition.

As described above, during rewinding, it is detected that the film 147 is rewound by the film moving-quantity detecting means (not shown). At the time when it is detected by the film moving-quantity detecting means that the rewinding of the film 147 ends (S63) (at this time, a condition becomes the condition as shown in FIG. 23), when the control means (not shown) normally rotates the motor 101 (S64), the gear arm 110 is rotated to the position where the engagement 110e is abutted against the abutment 113b of the gear arm stopper 113. When the normal rotation of the motor 101 starts, pulse count starts by the photo-interrupter 103 (S65).

Thus, since the rewinding engagement 110b of the gear arm 110 is retreated from the rotational locus of the rewinding engagement lever 114, the rewinding engagement lever 114 is rotated by the biasing force of the rewinding release spring 116 until the rewinding engagement lever 114 is abutted against the boss 118 that is a stopper.

By the rotation of the rewinding engagement lever 114, the film-end detecting lever 120 connected by the strip element 119 is angularly moved in the CCW direction in the figure, and becomes a condition shown in FIGS. 33A and 33B.

At the time when the count due to the photo-interrupter 103 reaches the pulses P2 which are set beforehand (S66), when the control means (not shown) reversely rotates the motor 101 (S67), the condition becomes a condition shown in FIGS. 32A and 32B. The rotary tube 133 is rotated in the CW direction in FIG. 22. The changing-over cams 133c and 133b further rotate the changing-over lever 130 in the CCW direction in FIG. 21. The changing-over lever 130 passes the forward end 133c and becomes free. The feeding engagement lever 123 connected by the string 132 is rotated in the CW direction in the figure by the feeding engagement spring 127. Accordingly, the changing-over lever 130 is rotated in the CW direction in FIG. 21, and stops at a position abutted against the boss 148 that is an initial-position stopper (refer to FIGS. 31A and 31B).

The motor 101 is further reversely rotated so that the rotary tube 133 is rotated. The switch B is turned ON by the switch cam 133g of the rotary tube 133 (S68). The linear tube 134 continues to be moved rearwardly. When the switch A is turned OFF by the switch cam 133f of the rotary tube 133 (S69), the control means (not shown) stops the motor 101 (S70). In this manner, the linear tube 134 is returned to the initial position, and the collapsible mount ends.

According to the driving-force transmission mechanism for the camera, the lens frame is driven only by the motor that is the single rotational driving source, and the film can be wound and rewound. Thus, it is possible to provide a camera which is low in cost and which is space-saving.

In this invention, it is apparent that working modes different in a wide range can be formed on the basis of this invention without departing from the spirit and scope of the invention. This invention is not restricted by any specific embodiment except as limited by the appended claims.

What is claimed is:

1. A camera having a device for feeding a film, comprising:

driving means for generating a driving force;

a driven member engaging said driving means, shaft means being rotated by said driven member when said driving means drives said driven member, a driving member engaging a first means to be driven for moving said shaft means in an axial direction when said shaft means is rotated, and an engagement member being selectively engaged with said shaft means and further engaging a second means to be driven.

2. A camera according to claim 1, wherein said driving means is a motor capable of being forwardly and reversely rotated.

3. A camera according to claim 1, wherein said first means to be driven is a means for selectively winding and rewinding a film about a film take-up member.

4. A camera according to claim 1, wherein said second means to be driven is a means for selectively rewinding the film and sending a film about a film spool.

5. A camera according to claim 1, wherein said shaft means has a pair of opposing ends thereof, at least one of which is hemi-spherically shaped.

6. A camera according to claim 1, wherein at least one of said first means to be driven and said second means to be driven includes a worm gear and a worm wheel in meshing engagement.

7. A camera according to claim 6, wherein said worm wheel has a bearing which consists of a plurality of projections for slidably engaging a central opening in said worm wheel to reduce the surface area of engagement between said bearing and said opening to a plurality of points equal in number to the plurality of projections.

8. A camera according to claim 7, wherein three projections are provided.

9. A camera according to claim 8, wherein two of said projections are aligned along opposite ends of common diameter which is parallel to the axis of said shaft.

10. A camera according to claim 9 wherein a third projection extends toward said shaft means and is substantially perpendicular to said common diameter.

11. A camera according to claim 7, wherein each projection has a curved surface.

12. A camera according to claim 1, further including a bearing for supporting said shaft means, and bending prevention means for preventing bending with respect to a bending force received by said shaft means when said shaft means is moved angularly.

13. A camera according to claim 1, including a bearing for supporting said shaft means, one end of said shaft means extending into an opening in said bearing and having a hemispherical-shaped end engaging a substantially flat bottom of said opening to reduce surface contact therebetween.

14. A camera according to claim 1, including a bearing for supporting said shaft means, one end of said shaft means extending into an opening in said bearing and having a substantially flat end; and a hemispherical-shaped projection extending upwardly from a bottom of said opening and engaging said flat end of said shaft means to reduce surface contact therebetween.

15. A camera according to claim 1, including a bearing for supporting an end of said shaft means;

said end of said shaft means extending into an opening in said bearing;

a single spherical-shaped member arranged in said opening and engaging a substantially flat base in said opening and a substantially flat end surface of said shaft means to reduce surface contact therebetween to substantially point contacts.

16. A camera according to claim 1, wherein means are provided at spaced intervals along said shaft for limiting bending of said shaft due to a load imposed on the shaft by at least one of said driven means.

17. A camera according to claim 16, wherein at least one of said means for limiting shaft bending comprises:

a member having a curved surface conforming to a cylindrical shape of said shaft.

18. A camera according to claim 17, wherein said curved surface is spaced from said shaft means to provide a gap between said shaft means and said curved surface when no bending of the shaft means occurs.

19. A camera according to claim 17, wherein at least one bending limiting member is an elongated member for engaging a substantial length of said shaft which is substantially equal to a length of said bending limiting member.

20. A camera according to claim 19, wherein said driving means includes a rotatable driving gear;

said first member to be driven, being a driven gear in meshing engagement with said driving gear and axially moveable with said shaft;

at least one of said gears having a length in an axial direction which is greater than an axial length of the other of said gears whereby said gears remain in meshing engagement even though the gears move relative to one another in an axial direction during operation of the driving means.

21. A camera according to claim 19, wherein said driving means includes a rotatable driving gear;

said first member to be driven, being a driven gear in meshing engagement with said driving gear and axially moveable with said shaft;

at least one of said gears having an axial length sufficient to assure that said gears remain in meshing engagement even though the gears move relative to one another in an axial direction during operation of the driving means.

22. A camera according to claim 1, wherein said first means to be driven and said second means to be driven are each comprised of a worm gear and a worm wheel in meshing engagement, the worm gear of first means to be driven having a lead angle $\gamma K$, the worm gear of said second means to be driven having a lead angle $\gamma R$ wherein $\gamma K \leq \gamma R$.

23. A camera having a device for feeding a film, comprising:

driving means for generating a rotative driving force;

first means to be driven for selectively feeding the film in a first direction and a second direction opposite to said first direction;

second means to be driven for selectively feeding the film in said second direction away from said second means to be driven, and in said first direction opposite to said second direction;

first shaft means including means engaging said first means to be driven, said first shaft means being moved in an axial direction when said shaft means is rotated; and second shaft means engaging said second means to be driven, said second shaft means being selectively engageable with said first shaft means, said second shaft means being moved in an axial direction due to rotation of said second means to be driven.

24. A camera according to claim 23, wherein said driving means is a motor capable of being forwardly and reversely rotated.

25. A camera according to claim 23, wherein said first means to be driven is a means for selectively winding and unwinding a film about a film winding spool.

26. A camera according to claim 23, wherein said second means to be driven is a means for selectively rewinding and unwinding a film about a film winding shaft.

27. A camera according to claim 23, wherein said shaft means has a pair of opposing ends, at least one of which is hemi-spherically shaped.

28. A camera according to claim 23, wherein at least one of said first means to be driven and said second means to be driven includes a worm gear and a worm wheel.

29. A camera according to claim 28, wherein said worm wheel has a bearing which consists of a plurality of projections for slidably engaging a central opening in said worm wheel to reduce the surface area of engagement between said bearing and said opening to a plurality of points equal in number to the plurality of projections.

30. A film feeding device for a camera, comprising:

a first shaft movable in an axial direction, said first shaft being selectively forwardly rotated or reversely rotated by a motor;

a first helical gear provided on said first shaft and in meshing engagement with a film winding spool;

a second shaft extending coaxially with said first shaft and rotatably arranged and located at a position spaced axially away from said first shaft;

a second helical gear provided on said second shaft and in meshing engagement with an engagement element which is engaged with a film winding shaft within a film cartridge; and connecting means provided on an end surface of said first shaft extending toward said second shaft, for being selectively connected to an end surface of said second shaft for rotating said second shaft therewith when said first shaft is moved axially toward said second shaft and is rotated, wherein said first helical gear axially moves said first shaft so as to be spaced away from said second shaft when said first shaft is driven in forward rotation upon winding of a film about the film winding spool, and axially moves said first shaft so as to be connected to said second shaft when said first shaft is driven in reverse rotation upon rewinding of the film in the film cartridge.

31. A film feeding device for a camera, comprising:

a first shaft being mounted in a support for movement in an axial direction, said first shaft being forwardly rotated or reversely rotated by a motor;

a second shaft extending coaxially with said first shaft and rotatably arranged at a position axially spaced away from said first shaft;

a first connecting gear provided on said first shaft and in meshing engagement with a film winding spool;

a second connecting gear provided on said second shaft and in meshing engagement with an engaging element which is engaged with a film winding shaft within a film cartridge; and connecting means provided on end surfaces of said first and second shafts which are opposite each other, said connecting means integrally connecting said first and second shafts for rotation about a common axis when said first shaft is moved axially toward said second shaft, wherein said first connecting gear axially moves said first shaft away from said second shaft when said first shaft is driven in normal rotation upon winding of a film about the film winding spool, and said first connecting gear axially moves said first shaft so as to be connected to said second shaft when said first shaft is driven in reverse rotation upon rewinding of the film into the film cartridge.

* * * * *